United States Patent
Ma et al.

(10) Patent No.: US 12,361,513 B2
(45) Date of Patent: Jul. 15, 2025

(54) IMAGE PROCESSING METHOD, ELECTRONIC DEVICE, AND IMAGE DISPLAY SYSTEM

(71) Applicant: BOE TECHNOLOGY GROUP CO., LTD., Beijing (CN)

(72) Inventors: Xiaohui Ma, Beijing (CN); Youxue Wang, Beijing (CN); Liye Duan, Beijing (CN); Kai Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 287 days.

(21) Appl. No.: 17/795,759

(22) PCT Filed: Jun. 9, 2021

(86) PCT No.: PCT/CN2021/099118
§ 371 (c)(1),
(2) Date: Jul. 27, 2022

(87) PCT Pub. No.: WO2022/022086
PCT Pub. Date: Feb. 3, 2022

(65) Prior Publication Data
US 2023/0086245 A1  Mar. 23, 2023

(30) Foreign Application Priority Data
Jul. 31, 2020 (CN) .......................... 202010760138.7

(51) Int. Cl.
*G06T 3/40* (2024.01)
*G06T 7/11* (2017.01)
*G06T 7/194* (2017.01)

(52) U.S. Cl.
CPC .................. *G06T 3/40* (2013.01); *G06T 7/11* (2017.01); *G06T 7/194* (2017.01)

(58) Field of Classification Search
CPC ... G06T 3/40; G06T 7/11; G06T 7/194; G06T 9/20; G06T 7/90; G06T 9/001; H04N 19/20
See application file for complete search history.

(56) References Cited

U.S. PATENT DOCUMENTS

2007/0092138 A1* 4/2007 Tseng ........................ G06T 5/92
382/274
2010/0303360 A1  12/2010 Matsuda
(Continued)

FOREIGN PATENT DOCUMENTS

CN  102831624 A  12/2012
CN  104899853 A  9/2015
(Continued)

*Primary Examiner* — Chong Wu
(74) *Attorney, Agent, or Firm* — XSENSUS LLP

(57) ABSTRACT

An image processing method includes: acquiring first image data of a first image, the first image data including pixel values of a plurality of pixels in the first image; a first compression-allowed region existing in the first image, obtaining region expression information of the first compression-allowed region, the first compression-allowed region including a region where a plurality of first pixels are located, and a difference between pixel values of any two first pixels in the plurality of first pixels being within a preset range; determining a region pixel value of the first compression-allowed region according to a pixel value of at least one first pixel in the first compression-allowed region; and generating second image data of the first image, the second image data including region expression information and the region pixel value of the first compression-allowed region.

17 Claims, 10 Drawing Sheets

(56) References Cited

U.S. PATENT DOCUMENTS

2010/0310175 A1* 12/2010 Holt .................. G06T 7/0004
382/195
2017/0249743 A1    8/2017 Yuan
2020/0226729 A1*  7/2020 Zhang ................. G06T 7/521

FOREIGN PATENT DOCUMENTS

CN    109889841 A    6/2019
CN    111327905 A    6/2020

* cited by examiner

| In a case where a second compression-allowed region exists in the first image, determine a sub-region formed by at least one border with the second preset shape in the second compression-allowed region to be the first compression-allowed region | S105 |

| Determine inscribed figures each with the second preset shape inside the outer border of the second compression-allowed region, and determine a border of an inscribed figure having the largest area in the inscribed figures each with the second preset shape to be an outer border of the first compression-allowed region | S1051 |

| Determine circumscribed figures each with the second preset shape outside the inner edge of the second compression-allowed region, and determine a border of a circumscribed figure having the smallest area in the circumscribed figures each with the second preset shape to be an inner border of the first compression-allowed region | S1052 |

FIG. 11

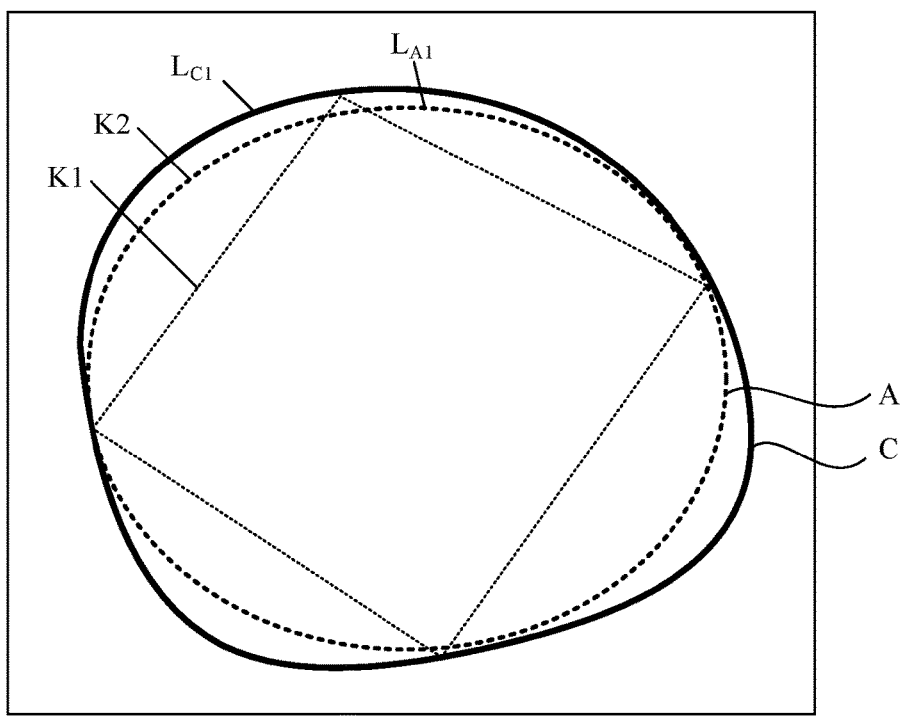

FIG. 12

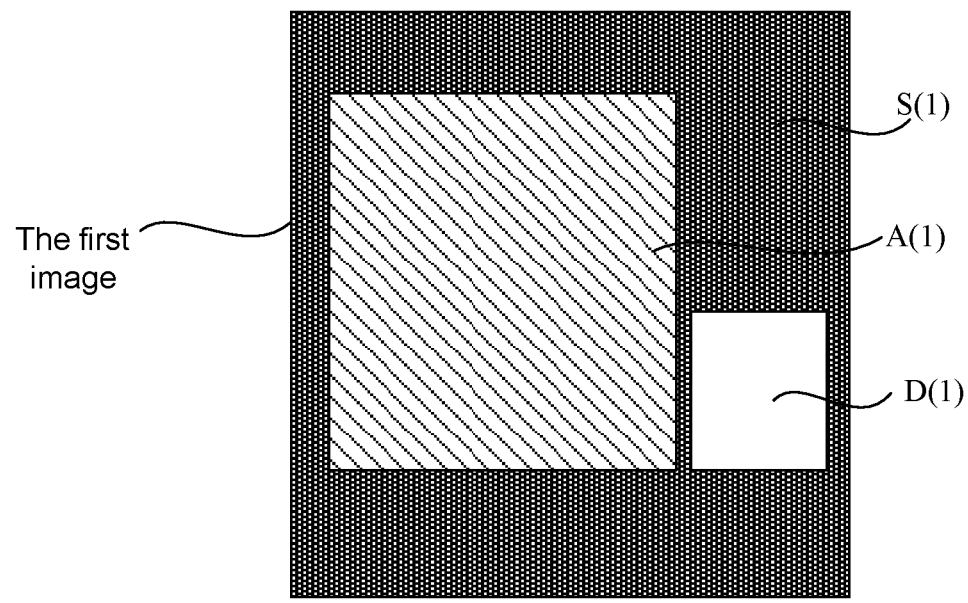
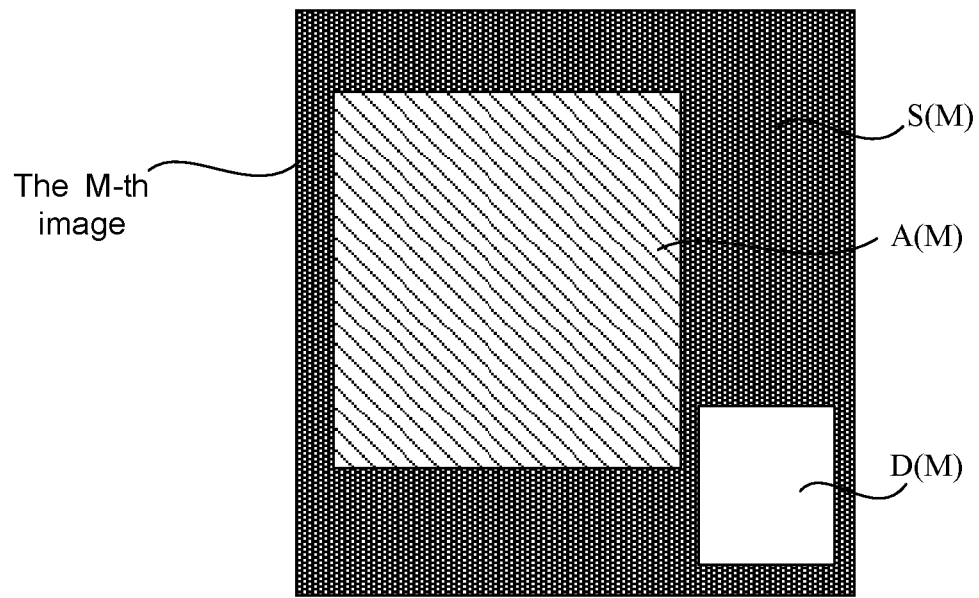
FIG. 15 ced figures each with the second preset shape outside an inner
IMAGE PROCESSING METHOD, ELECTRONIC DEVICE, AND IMAGE DISPLAY SYSTEM

CROSS-REFERENCE TO RELATED APPLICATIONS

The present disclosure is a national phase entry under 35 USC 371 of International Patent Application No. PCT/CN2021/099118, filed on Jun. 9, 2021, which claims priority to Chinese Patent Application No. 202010760138.7, filed on Jul. 31, 2020, which are incorporated herein by reference in their entirety.

TECHNICAL FIELD

The present disclosure relates to the field of display technologies, and in particular, to an image processing method, an electronic device, and an image display system.

BACKGROUND

With the development of technologies, electronic devices, such as cameras, phones, or computers, are getting more and more intelligent, and the functions thereof are getting more and more diverse, and moreover, mutual transmission of resources between different electronic devices is getting more and more extensive.

SUMMARY

In an aspect, an image processing method is provided. The image processing method includes: acquiring first image data of a first image; the first image data including pixel values of a plurality of pixels in the first image; a first compression-allowed region existing in the first image, obtaining region expression information of the first compression-allowed region; the first compression-allowed region including a region where a plurality of first pixels continuously distributed in the first image are located, and a difference between pixel values of any two first pixels in the plurality of first pixels being within a preset range; determining a region pixel value of the first compression-allowed region according to a pixel value of at least one first pixel in the first compression-allowed region; generating second image data of the first image; the second image data of the first image including region expression information of the first compression-allowed region and the region pixel value of the first compression-allowed region.

In some embodiments, obtaining the region expression information of the first compression-allowed region includes: determining an initial region where at least one object is located in the first image; a figure formed by a border of the at least one object being in a first preset shape; and the first compression-allowed region existing in the initial region, obtaining the region expression information of the first compression-allowed region in the initial region.

In some embodiments, after determining the initial region where the at least one object in the first image is located, obtaining the region expression information of the first compression-allowed region further includes: obtaining a reference pixel value; the reference pixel value being a pixel value with largest proportion in number among pixel values of pixels in the initial region; and determining the first compression-allowed region in the initial region; the first compression-allowed region in the initial region including a region where first pixels in the initial region that are continuously distributed in which a difference between a pixel value of each first pixel and the reference pixel value being within the preset range are located.

In some embodiments, the region pixel value of the first compression-allowed region in the initial region is the reference pixel value of the initial region.

In some embodiments, the first compression-allowed region has at least one closed border, and a figure formed by each border is in a second preset shape.

In some embodiments, before generating the second image data of the first image, the image processing method further includes: a second compression-allowed region existing in the first image, determining a sub-region formed by at least one border with the second preset shape in a second compression-allowed region to be the first compression-allowed region. The second compression-allowed region includes a region where the plurality of the first pixels continuously distributed in the first image are located. The region expression information of the first compression-allowed region including the second preset shape and position information corresponding to each border of the first compression-allowed region, and the position information is configured to represent a position of the border based on the second preset shape of the border.

In some embodiments, determining the sub-region formed by the at least one border with the second preset shape in the second compression-allowed region to be the first compression-allowed region includes: determining inscribed figures each with the second preset shape inside an outer border of the second compression-allowed region; and determining a border of an inscribed figure having a largest area in the inscribed figures each with the second preset shape to be an outer border of the first compression-allowed region.

In some embodiments, determining the sub-region formed by the at least one border with the second preset shape in the second compression-allowed region to be the first compression-allowed region includes: determining circumscribed figures each with the second preset shape outside an inner border of the second compression-allowed region; and determining a border of a circumscribed figure having a smallest area in the circumscribed figures each with the second preset shape to be an inner border of the first compression-allowed region.

In some embodiments, determining the region pixel value of the first compression-allowed region according to the pixel value of the at least one first pixel in the first compression-allowed region includes: obtaining an average value of the pixel values of the plurality of first pixels in the first compression-allowed region to obtain the region pixel value of the first compression-allowed region.

In some embodiments, the second image data of the first image further includes pixel values of second pixels in the first image, and the second pixels are pixels located outside the first compression-allowed region in the first image.

In another aspect, an image processing method is provided. The image processing method includes: acquiring an image sequence set; the image sequence set including consecutive N images, N being an integer greater than 1; data of a first image in the N images being first image data, and the first image data including pixel values of a plurality of pixels in the first image; obtaining second image data of from the first image to a N-th image in sequence; the second image data of the first image including region expression information and a region pixel value of a first compression-allowed region of the first image. A difference between a pixel value of each pixel in the first compression-allowed region of the first image and a pixel value of a respective pixel in a first compression-allowed region of an M-th image are within a preset range, the second image data of the M-th image includes region expression information and a region pixel value of the first compression-allowed region of the M-th image and pixel values of second pixels in the M-th image, and the region expression information and the region pixel value of the first compression-allowed region of the M-th image are the region expression information and the region pixel value of the first compression-allowed region of the first image respectively; M is greater than or equal to 2 and is less than or equal to N, and M is an integer.

In some embodiments, each image includes a foreground part and a background part; a background part of the first image has the first compression-allowed region. A foreground part of the M-th image has no overlapped region with the first compression-allowed region, the region expression information and the region pixel value of the first compression-allowed region of the M-th image included in the second image data of the M-th image are the region expression information and the region pixel value of the first compression-allowed region of the first image respectively.

In some embodiments, the image processing method further includes sending the second image data to an electronic device.

In yet another aspect, an image processing method is provided. The image processing method includes: acquiring second image data of an image; wherein a first compression-allowed region exists in the image, the first compression-allowed region includes a region where a plurality of first pixels continuously distributed are located in the image, and a difference between pixel values of any two first pixels in the plurality of first pixels is within a preset range; the second image data of the image includes region expression information of the first compression-allowed region and a region pixel value of the first compression-allowed region; and converting the second image data of the image into third image data of the image; pixel values of pixels inside the first compression-allowed region in the third image data being each the region pixel value.

In some embodiments, the image processing method further includes performing a display according to the third image data.

In yet another aspect, an electronic device is provided. The electronic device includes a memory and a processor. The processor is coupled to the memory. The memory has stored therein one or more computer programs. The processor is configured to execute the one or more computer program instructions to cause the electronic device to implement the image processing method described in the above embodiments.

In yet another aspect, an image display system is provided. The image display system includes: a first electronic device and a second electronic device. The second electronic device is coupled to the first electronic device. The first electronic device is configured to implement the image processing method described in some of the embodiments above. The second electronic device is configured to implement the image processing method described in some other embodiments above.

In yet another aspect, a non-transitory computer-readable storage medium is provided. The computer-readable storage medium stores computer program instructions, when run on a computer, cause the computer to implement the image processing method described in the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations to actual sizes of products, actual processes of methods or actual timings of signals to which the embodiments of the present disclosure relate.

FIG. 11 is a flow diagram of yet another image processing method, in accordance with some embodiments;

FIG. 12 is a schematic diagram showing regions of yet another first image, in accordance with some embodiments;

FIG. 15 is a diagram showing a comparison between a first image and a M-th image, in accordance with some embodiments;

DETAILED DESCRIPTION

Figure 1:
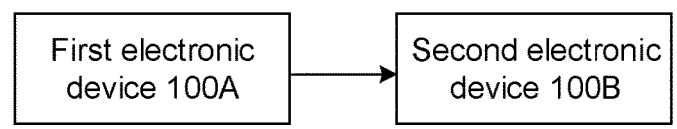
FIG. 1 is a structural diagram of an image display system, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are interpreted as open and inclusive meaning "including, but not limited to". In the description of the specification, terms such as "one embodiment", "some embodiments", "exemplary embodiments", "an example", "a specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, the terms "connected" and "coupled" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of the phrase "applied to" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

The term "substantially", "about" or "approximately" as used herein includes a stated value and an average value within an acceptable range of deviation of a particular value. The acceptable range of deviation is determined by a person of ordinary skill in the art in view of the measurement in question and the error associated with a particular amount of measurement (i.e., the limitations of the measurement system).

Some embodiments of the present disclosure provide an image display system 200, as shown in FIG. 1, the image display system 200 includes a first electronic device 100A and a second electronic device 100B that are coupled to each other.

For example, the first electronic device 100A may establish a connection with the second electronic device 100B through a wireless communication manner (e.g., Wi-Fi or Bluetooth). For example, the second electronic device 100B is connected to a wireless router or a wireless access point (AP) through a wireless communication manner or a wired communication manner. The first electronic device 100A is connected to the wireless router or the wireless AP through a wireless communication manner, so as to be connected with the second electronic device 100B. Of course, the embodiments of the present disclosure are not limited to this communication connection manner. For example, a connection between the second electronic device 100B and the first electronic device 100A may be established through a wired communication manner.

The first electronic device 100A and the second electronic device 100B may be applied to various scenarios. For example, the first electronic device 100A may be a desktop computer, a portable computer, a network server, a personal digital assistant (PDA), a mobile phone, a tablet computer, a wireless terminal device, or an embedded device; the second electronic device 100B may be a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant. The specific types of the first electronic device 100A and the second electronic device 100B are not limited in the embodiments of the present disclosure.

Figure 2:
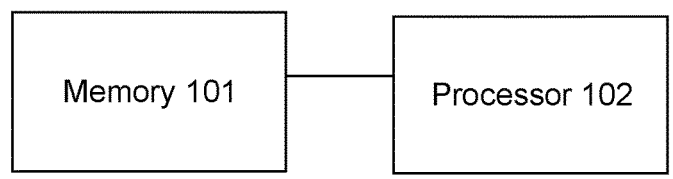
FIG. 2 is a structural diagram of an electronic device, in accordance with some embodiments.

Some embodiments of the present disclosure provide an electronic device 100, as shown in FIG. 2, the electronic device 100 includes a memory 101 and a processor 102. The memory 101 is coupled to the processor 102.

The memory 101 has stored therein one or more computer program instructions that may be executed by the processor 102.

The computer program, when executed by the processor 102, causes the electronic device 100 to implement the image processing method described in the following embodiments.

For example, the processor 102 may be a single processor, or a collective term of a plurality of processing elements. For example, the processor 102 may be a central processing unit (CPU), a microprocessor, an application specific integrated circuit (ASIC), or one or more integrated circuits for controlling the execution of programs of the solutions of the embodiments of the present disclosure, such as one or more microprocessors, or one or more field programmable gate arrays.

The memory 101 may be a single memory, or a collective term of a plurality of storage elements, and is used to store executable program codes or the like. For example, the memory may be a read-only memory (ROM) or any other type of static storage device that may store static information and instructions, or a random access memory (RAM), or any other type of dynamic storage device that may store information and instructions. Alternatively, the memory may be an electrically erasable programmable read-only memory (EEPROM), a compact disc read-only memory (CD-ROM) or any other compact disc storage, an optical disc storage (including a compressed disc, a laser disc, an optical disc, a digital versatile disc, a Blu-ray disc), a magnetic disc storage medium, any other magnetic storage device, or any other medium that may be used to carry or store a desired program code in a form of instructions or data structures and can be accessed by a computer, which is not limited thereto.

The memory 101 is used for storing computer program instructions (e.g., application program codes) for implementing the solutions of the present disclosure therein, and the processor 102 controls the computer program instructions to be executed. The processor 102 is used for executing the computer program instructions stored in the memory 101, so as to control the electronic device 100 to implement the image processing method provided by the following embodiments of the present disclosure.

In some embodiments, the first electronic device 100A and the second electronic device 100B in the image display system 200 may both adopt the electronic device 100. That is, the image display system 200 includes two electronic devices 100 that are communicated with each other, in which one electronic device 100 serves as the first electronic device 100A, and the other electronic device 100 serves as the second electronic device 100B.

In a process when the two electronic devices 100 transmit data, for example, the first electronic device 100A acquires first image data of a first image, and processes (e.g., compresses) the first image data to generate second image data, and sends the second image data to the second electronic device 100B. Correspondingly, the second electronic device 100B receives the second image data, and processes (e.g., decompresses) the second image data, and obtains third image data, so that the second electronic device 100B may display an image according to the third image data.

Figure 3:
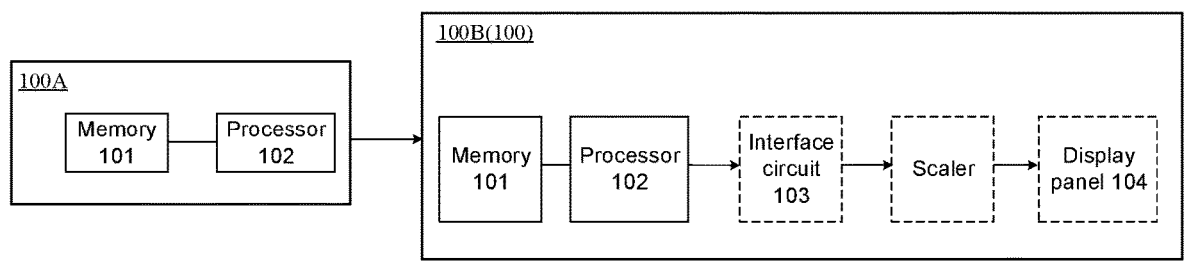
FIG. 3 is a structural diagram of another image display system, in accordance with some embodiments.

For example, in a case where the electronic device 100 (i.e., the second electronic device 100B) is a display apparatus, the display apparatus may be, for example, a display, or a product including a display, such as a television, a computer (an all-in-one machine or a desktop computer), a tablet computer, a mobile phone, or an electronic picture screen. As shown in FIG. 3, the electronic device 100 (i.e., the second electronic device 100B) further includes an interface circuit 103, a scaler, and a display panel 104. The interface circuit 103 is coupled to the processor (i.e., the processor 102 in the second electronic device 100B), and the scaler is coupled to the interface circuit 103 and the display panel 104. For example, the interface circuit 103 may adopt a video graphics array (VGA) interface, and the display panel 104 may adopt a liquid crystal display panel. The interface circuit 103 is used to receive the third image data; the scaler is used to scale (i.e., compress or stretch) the third image data, so that a resolution of an image corresponding to the image data after being scaled is equal to a resolution of the display panel; the display panel 104 is used to display the image according to image data after being scaled.

Figures 4, 5:
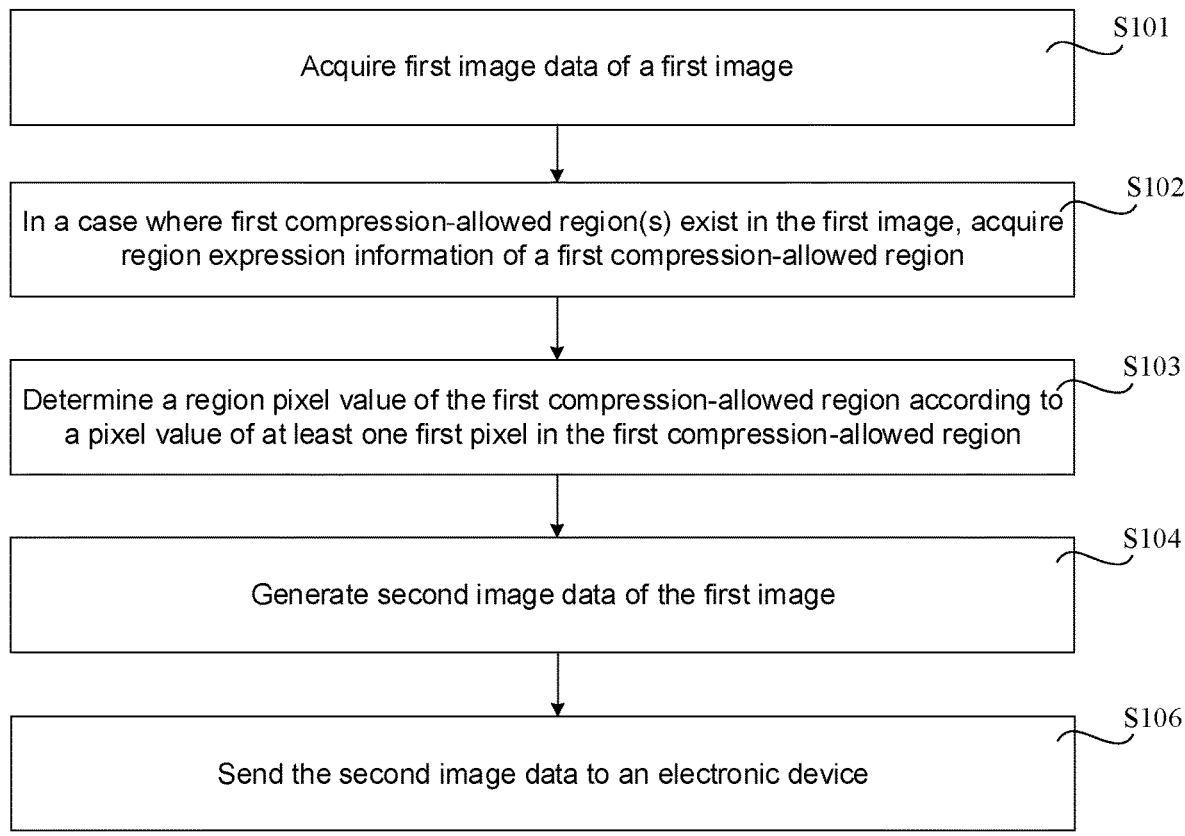
FIG. 4 is a schematic diagram showing pixels of a first image, in accordance with some embodiments.
FIG. 5 is a flow diagram of an image processing method, in accordance with some embodiments.

The first image data includes pixel values of a plurality of pixels in the first image. In a case where the plurality of pixels are arranged in an array, the pixel values of the plurality of pixels in the first image data are also arranged in an array. For example, as shown in FIG. 4, the plurality of pixels $P_{1-1}$, $P_{1-2}$, . . . , $P_{n-m}$ in the first image T are arranged in an array of n rows and m columns, where n and m are both positive integers, and the pixel values $P_{1-1}$, $P_{1-2}$, . . . , $P_{n-m}$ of the plurality of pixels in the first image data are also arranged in an array.

It will be noted that, for the convenience of description, a pixel and a pixel value of the pixel in the embodiments of the present disclosure are represented by a same symbol. For example, a pixel value of a pixel $P_{1-1}$ in the first row and the first column is $P_{1-1}$, but they have completely different meanings.

For high-quality images with high resolution and large size, such as high-definition pictures, high-definition video images, or medical computed tomography (CT) images, the pixel value of each pixel occupies a large number of bytes (for example, in a case where the pixel value is a gray scale value, a grayscale value occupies 16 bits, i.e., which occupies 2 bytes), and in a case where the pixels in the image data are arranged in an array, the pixel values of the pixels are also arranged in an array, so that the pixel values of the pixels occupy a large storage resource. For an ordinary image, the number of bytes occupied by the pixel value of the pixel is relatively small (for example, a grayscale value of a pixel occupies 8 bits, i.e., which occupies 1 byte). Therefore, a storage resource required by the electronic device (e.g., a computer) to store a high-quality image is greater than a storage resource required to store an ordinary image, which results in a high cost of saving high-quality images in the electronic device.

In some examples, the first electronic device 100 performs image processing on the first image data; in a case where the pixel values of the pixels in the first image data are arranged in an array, the pixel values of the pixels in the second image data generated are also arranged in an array. Since data volume of the second image data is relatively large, in a process of transmitting the second image data by the first electronic device 100A to the second electronic device 100B, a number of data bits transmitted in a unit time is relatively high, that is, the code rate is high, which leads to easy loss of image data during data transmission. In addition, the processes of image processing performed by the first electronic device 100A and the second electronic device 100B are both relatively complicated, and the required processing resources are both relatively large, resulting in an increase of the cost of image processing performed by the electronic device.

Some embodiments of the present disclosure provide an image processing method. The image processing method may be applied to the electronic device 100 as described above, for example, which may be applied to the first electronic device 100A as described above.

As shown in FIG. 5, the image processing method includes the following steps.

In S101, first image data of a first image is acquired. The first image data includes pixel values of a plurality of pixels in the first image.

It will be understood that, each pixel includes a plurality of sub-pixels (for example, the plurality of sub-pixels include red sub-pixels, green sub-pixels, and blue sub-pixels), a pixel value of the pixel may include the grayscale values of the sub-pixels. For example, a data format of the pixel value may adopt a RGB data format (for example, R may represent the grayscale voltage of the red sub-pixel, G may represent the gray scale voltage of the green sub-pixel, and B may represent the gray scale voltage of the blue sub-pixel), or a YUV data format (for example, Y may represent brightness, U and V may represent chroma).

In S102, in a case where first compression-allowed region(s) exist in the first image, region expression information of a first compression-allowed region is obtained. The first compression-allowed region includes a region where a plurality of first pixels continuously arranged are located in the first image. Each first pixel is one of the plurality of pixels, and a difference between pixel values of any two first pixels in the plurality of first pixels is within a preset range.

Figures 6, 7:
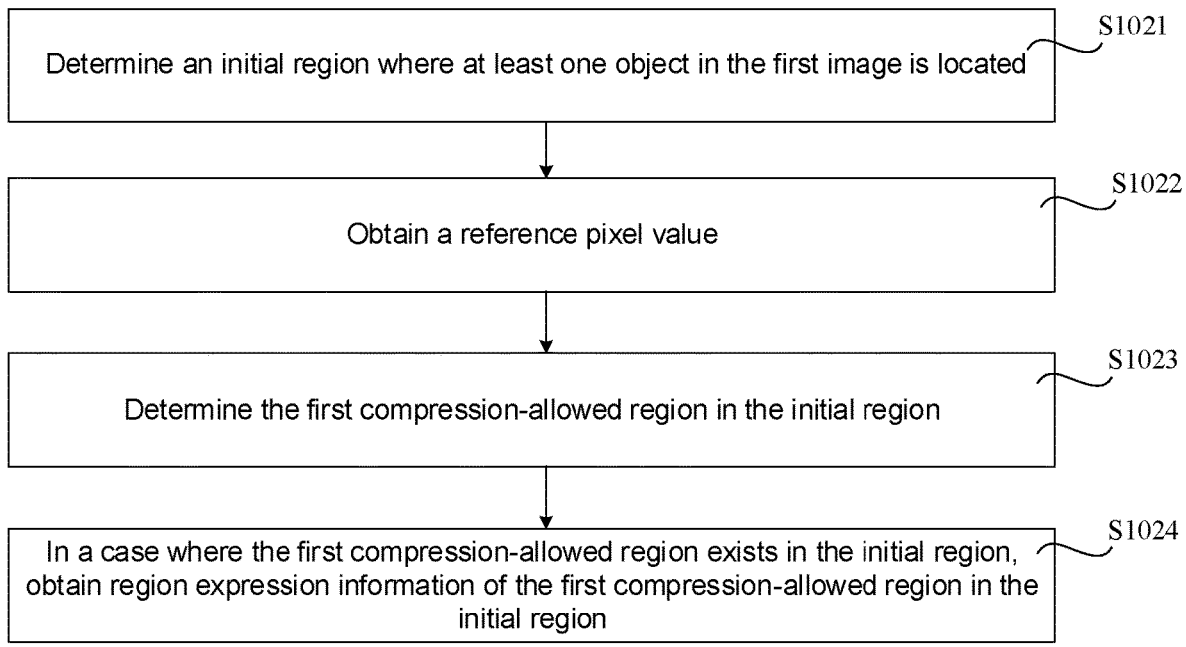
FIG. 6 is a schematic diagram showing pixels of another first image, in accordance with some embodiments.
FIG. 7 is a flow diagram of another image processing method, in accordance with some embodiments.

For example, as shown in FIG. 6, the first compression-allowed region A in the first image T is a region in which three rows and three columns are distributed in an array with a pixel $P_{3-3}$ located in the third row and the third column as a center, and the pixel values $P_{2-2}$, $P_{2-3}$, $P_{2-4}$, $P_{3-2}$, $P_{3-3}$, $P_{3-4}$, $P_{4-2}$, $P_{4-3}$ and $P_{4-4}$ of the plurality of first pixels $P_{2-2}$, $P_{2-3}$, $P_{2-4}$, $P_{3-2}$, $P_{3-3}$, $P_{3-4}$, $P_{4-2}$, $P_{4-3}$ and $P_{4-4}$ in the first compression-allowed region A are approximately equal.

For example, in a case where the first image is a grayscale image, the pixel value of the pixel may be the grayscale value of the pixel. In this case, the grayscale values of the first pixels in the first compression-allowed region are approximately the same.

It will be noted that, the region expression information of the first compression-allowed region refers to information for determining a position and a size of the first compression-allowed region. For example, the region expression information of the first compression-allowed region includes a shape of the first compression-allowed region and coordinates of the first pixels in the first compression-allowed region. The coordinates may be set according to actual situations, which are not limited here. For example, in a case where the pixels are arranged in an array, the row and column where a pixel is located are taken as the abscissa and ordinate of the pixel respectively. For example, the coordinates of the pixel $P_{n-m}$ in the n-th row and the m-th column are represented by (n, m).

It will be understood that, if a difference between a pixel value of a pixel in the first image and a pixel value of at least one adjacent pixel in the first image is within a preset range, it is considered that the pixel value of the pixel is equal to the pixel value of the at least one adjacent pixel. A region where the pixel and the at least one adjacent pixel are located is the first compression-allowed region, and the plurality of first pixels include the pixel and the at least one adjacent pixel. The preset range as described above may be set according to actual situations, which is not limited here. For example, for any two first pixels of the plurality of first pixels in the first compression-allowed region, the pixel value of one is PE1 and the pixel value of the other first pixel of the two first pixels is PE2, and the difference between the pixel values of the two first pixels is (PE1−PE2)/PE1, and then the preset range of the difference (absolute value) is less than or equal to 1%. For example, the preset range may be less than or equal to 0.5%.

It will be noted that, there is at least one mutational pixel in the first compression-allowed region, and there is a large difference between a pixel value of the at least one mutational pixel and the pixel values of the first pixels in the first compression-allowed region. The distribution of the at least one mutational pixel is not continuous, or an area of continuous distribution of the at least one mutational pixel is small, so that the influence of the pixel value of the at least one mutational pixel on the first compression-allowed region may be ignored. That is, the difference between the pixel value of the at least one mutational pixel and the pixel value of each first pixels is considered to be within the preset range.

For example, in the case where the first compression-allowed region exists in the first image, as shown in FIG. 7, obtaining the region expression information of the first compression-allowed region includes S1021.

In S1021, an initial region where at least one object in the first image is located is determined. A figure formed by a border of the at least one object is in a first preset shape.

It will be understood that, the object may be an object with a certain contour line, such as a human, the sun, an animal, a plant, a vehicle, a house, a mountain or a river. For example, each object has at least one edge. A border (e.g., an outer border) of the object may be the contour line of the object, and the figure formed by the contour line is in the first preset shape. The first preset shape may be a regular shape. For example, the first preset shape of the figure formed by a border of the moon is approximately a circle. Alternatively, the first preset shape may be an irregular shape. For example, the figure formed by a border of a human including a border of the head and a border of the body is an irregularly shaped figure. For example, there are two types of objects in the first image T shown in FIG. 8, namely the sun and the house, and three initial regions exist in the first image, which are an initial region B1 where the sun is located, and an initial region B2 where two houses with a close distance are located, and an initial region B3 where a house that is far away from the two houses with a close distance is located.

In addition, for a same type of objects with a small distance or no distance (that is, the pixels are continuously distributed), the same type of objects may be classified into a same initial region, or the same type of objects may be classified into different initial regions.

For example, in a case where the feature information of the objects in the first image is approximately equal to the feature information in the model database, at least one object in the first image is identified by comparing the first image with a model database. In this case, the initial region includes a closed region enclosed by an outer contour line of the at least one object.

It will be noted that, the electronic device 100 is pre-configured with the model database. For example, the first electronic device 100A is pre-configured with the model database. The model database includes feature information that is capable of describing objects of various types, and the feature information includes, for example, color, texture, shape, contour, and spatial relationship. The model database can describe a plurality of elements that are expected to co-exist in a single object in a plurality of types of objects, and the information of the plurality of elements may serve as the feature information of the single object. For example, if the object type is defined as "human", the plurality of elements that are expected to co-exist in a single object of the object type may be "arms", "legs", "head", "body", and the like; if the object type is "a face of a mammal", the plurality of elements that are expected to co-exist in the single object of the object type may be "ears", "eyes", "nose", "mouth", "hair", and the like; if the object type is "vehicle", the plurality of elements that are expected to co-exist in a single object of the object type may be "windshield", "rearview mirror", "headlights", "license plate", and the like; if the object type is "house", the plurality of elements that are expected to co-exist in a single object of the object type may be "roof", "door", "window", "wall", and the like. The above examples of the model database are only exemplary and illustrative, and various general models may be designed according to specific applications in the embodiments of the present disclosure, which are not limited here.

Figure 8:
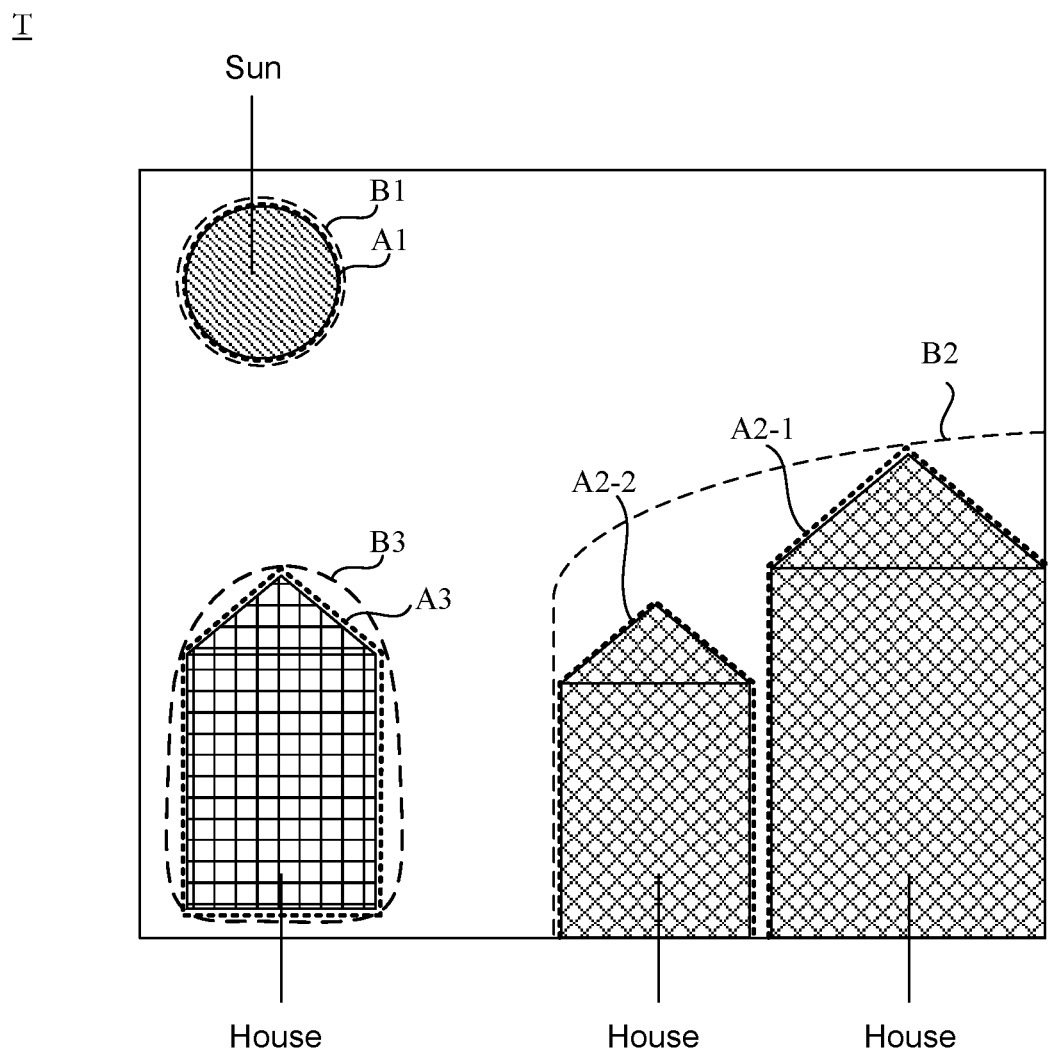
FIG. 8 is a schematic diagram showing regions of a first image, in accordance with some embodiments.

In addition, in a case where an object in the first image is incomplete, for example, a position of the object in the first image is proximate to a border of the first image, so that the object cannot be displayed completely. In this case, if the incomplete object is identified, the initial region includes a closed region enclosed by an outer contour line of the incomplete object and the border of the first image. For example, the initial region B2 in FIG. 8 is formed by the dotted line in the figure and the lower and right borders of the first image.

For example, after determining the initial region where the at least one object in the first image is located, obtaining the region expression information of the first compression-allowed region further includes following steps.

In S1022, a reference pixel value is obtained. The reference pixel value is a pixel value with the largest proportion in number among the pixel values of the pixels in the initial region.

For example, there are 5 pixels in the initial region, and the pixel values of the 5 pixels are $P_1$, $P_2$, $P_3$, $P_3$ and $P_3$, so that the number of the pixel value $P_1$ in these 5 pixel values is 1, and the proportion of the pixel value $P_1$ is (1/5); the number of the pixel value $P_2$ in these 5 pixel values is 1, and the proportion of the pixel value $P_2$ is (1/5); the number of the pixel value $P_3$ in these 5 pixel values is 3, and the proportion of the pixel value $P_3$ is (3/5). In this case, the pixel value $P_3$ has the largest proportion in number in these 5 pixel values, so that the reference pixel value of the initial region is the pixel value $P_3$.

In S1023, the first compression-allowed region in the initial region is determined. The first compression-allowed region in the initial region includes a region where first pixels in the initial region that are continuously distributed in which a difference between a pixel value of each first pixel and the reference pixel value is within a preset range are located.

It will be understood that, by comparing a pixel value of each pixel in the initial region with a reference pixel value, if the difference between the pixel value and the reference pixel value are within the preset range, the pixel value of each pixel is considered to be equal to the reference pixel value, and a region where the pixels are continuously distributed is the first compression-allowed region. The preset range here is the same as the above-mentioned preset range.

For example, referring to FIG. 8, by comparing a pixel value of each pixel in the initial region B1 with a reference pixel value of the initial region B1, a first compression-allowed region A1 in the initial region B1 is obtained, and a difference between each of pixel values of first pixels in the first compression-allowed region A1 and the reference pixel value of the initial region B1 is within a preset range, and the first pixels in the first compression-allowed region A1 are continuously distributed. By comparing a pixel value of each pixel in the initial region B2 with a reference pixel value of the initial region B2, a first compression-allowed region A2-1 and a first compression-allowed region A2-2 in the initial region B2 are obtained, a difference between each of pixel values of first pixels in the first compression-allowed region A2-1 and the first compression-allowed region A2-2 and the reference pixel value of the initial region B2 is within a preset range, the first pixels in the first compression-allowed region A2-1 are continuously distributed, and the first pixels in the first compression-allowed region A2-2 are continuously distributed; however, the plurality of first pixels in the first compression-allowed region A2-1 and the pixels in the first compression-allowed region A2-2 are not continuously distributed in a whole. By comparing a pixel value of each pixel in the initial region B3 with a reference pixel value of the initial region B3, a first compression-allowed region A3 in the initial region B3 is obtained, and a difference between each of pixel values of first pixels in the first compression-allowed region A3 and the reference pixel value of the initial region B3 is within a preset range, and the first pixels in the first compression-allowed region A3 are continuously distributed.

In S1024, in a case where a first compression-allowed region exists in the initial region, region expression information of the first compression-allowed region in the initial region is obtained.

For example, referring to FIG. 8, region expression information QA1 of the first compression-allowed region A1 in the initial region B1 may be obtained, and region expression information QA2-1 of the first compression-allowed region A2-1 and region expression information QA2-2 of the first compression-allowed region A2-2 in the initial region B2 may be obtained, and region expression information QA3 of the first compression-allowed region A3 in the initial region B3 may be obtained.

In S103, a region pixel value of the first compression-allowed region is determined according to a pixel value of at least one first pixel in the first compression-allowed region.

For example, a first compression-allowed region may have a single region pixel value.

For example, determining the region pixel value of the first compression-allowed region according to the pixel value of the at least one first pixel in the first compression-allowed region includes S1031.

In S1031, an average value of the pixel values of the plurality of first pixels in the first compression-allowed region is obtained to obtain the region pixel value of the first compression-allowed region.

It will be noted that, a manner of obtaining the average value of the pixel values of the plurality of first pixels in the first compression-allowed region may be selected according to actual situations, which is not limited here. For example, the average value of pixel values of some first pixels in the first compression-allowed region may be obtained, so as to shorten the data processing time; alternatively, the average value of the pixel values of all the first pixels in the first compression-allowed region may be obtained, so as to reduce the difference between the region pixel value and the pixel value of each first pixel.

For example, the region pixel value of the first compression-allowed region may be a pixel value with the largest proportion in number among the pixel values of the pixels in the first compression-allowed region. For example, in a case where the first image has an initial region, a region pixel value of the first compression-allowed region in the initial region may be the reference pixel value of the initial region.

In S104, second image data of the first image is generated. The second image data of the first image includes the region expression information of the first compression-allowed region and the region pixel value of the first compression-allowed region.

The second image data further includes pixel values of second pixels in the first image, and the second pixels are pixels located outside the first compression-allowed region in the first image.

It will be noted that, the region expression information of the first compression-allowed region, the region pixel value of the first compression-allowed region, and the pixel values of the second pixels in the second image data have a certain arrangement order, and the arrangement order may be determined according to actual situations. For example, the arrangement order is related to an encoding order of the pixel values in the first image data or a decoding order of the pixel values in the second image data, which is not specifically limited here. The encoding order of the pixel values in the first image data is the same as the decoding order of the pixel values in the second image data. For example, in the case where the plurality of pixels are arranged in an array, the pixel values of the plurality of pixels are also arranged in an array; the encoding order of the pixel values in the first image data may be such that the pixel values may be encoded row by row from the first row to the last row, and one by one in each row from the first column to the last column; moreover, the decoding order of the pixel values in the second image data is such that the pixel values may be decoded row by row from the first row to the last row, and one by one in each row from the first column to the last column. In this case, the region expression information of the first compression-allowed region, the region pixel value of the first compression-allowed region, and the pixel values of the second pixels in the second image data may be arranged such that row by row from the first row to the last row, and one by one in each row from the first column to the last column.

Figures 9, 10:
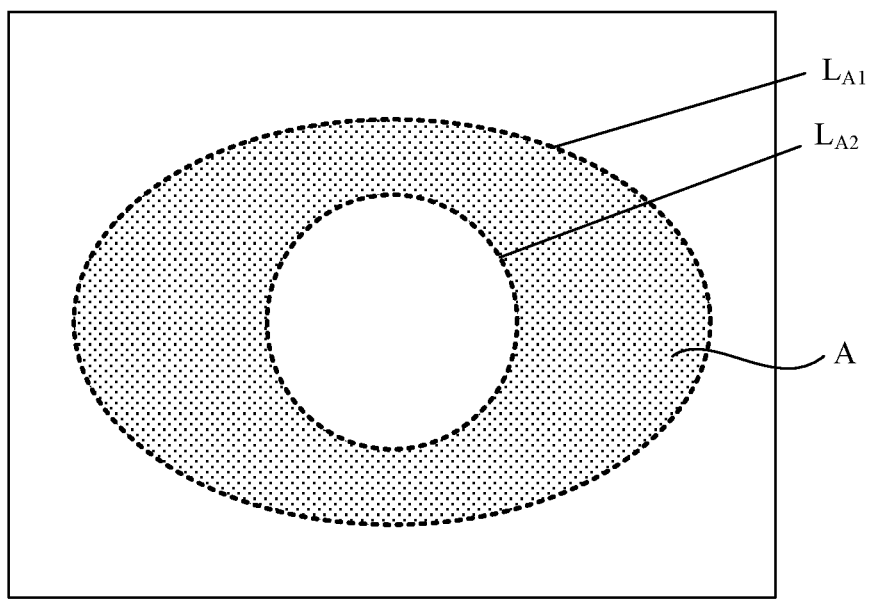
FIG. 9 is a schematic diagram showing pixels of yet another first image, in accordance with some embodiments.
FIG. 10 is a schematic diagram showing regions of another first image, in accordance with some embodiments.

For example, as shown in FIG. 9, in a case where the pixels $P_{1-1}$, $P_{1-2}$, . . . , $P_{5-4}$, and $P_{5-5}$ in the first image T are arranged in an array of 5 rows and 5 columns, and the first compression-allowed region A in the first image is a region where the pixels $P_{2-2}$, $P_{2-3}$, $P_{2-4}$, $P_{3-2}$, $P_{3-3}$, $P_{3-4}$, $P_{4-2}$, $P_{4-3}$ and $P_{4-4}$ arranged in an array of 3 rows and 3 columns with the pixel $P_{3-3}$ in the third row and the third column as a center are located, a region pixel value $P_A$ of the first compression-allowed region A in the second image data and the pixel values of the second pixels may be arranged such that row by row from the first row to the last row, and one by one in each row from the first column to the last column. The region pixel value $P_A$ occurs only once (i.e., which is encoded only once). For example, the region pixel value $P_A$ may be located at a position of a pixel in the first compression-allowed region A that occurs first in the encoding order, when encoding to other pixels in the first compression-allowed region A subsequently, these pixels will be skipped and no encoding is performed thereon. In this case, for the first image T in FIG. 9, the second image data may be arranged in an order of $P_{1-1}$, $P_{1-2}$, $P_{1-3}$, $P_{1-4}$, $P_{1-5}$, $P_{2-1}$, $P_A$, $P_{2-5}$, $P_{3-1}$, $P_{3-5}$, $P_{4-1}$, $P_{4-5}$, $P_{5-1}$, $P_{5-2}$, $P_{5-3}$, $P_{5-4}$, and $P_{5-5}$, moreover, the pixel $P_{2-2}$ is the pixel that occurs first, so that the region pixel value $P_A$ may be located at the position of the pixel $P_{2-2}$, and when scanning to other pixels $P_{2-3}$, $P_{2-4}$, $P_{3-2}$, $P_{3-3}$, $P_{3-4}$, $P_{4-2}$, $P_{4-3}$ and $P_{4-4}$, the pixel values of the other pixels are skipped and not preserved.

In addition, in a case where it is ensured that the region expression information $Q_A$ and the region pixel value $P_A$ are correlated with each other, the position of the region expression information $Q_A$ may be set according to the situation. For example, the region expression information $Q_A$ may be located near the position of the region pixel value $P_A$, such as a position between $P_{2-1}$ and $P_A$ (i.e., $P_{1-1}$, $P_{1-2}$, $P_{1-3}$, $P_{1-4}$, $P_{1-5}$, $P_{2-1}$, $Q_A$, $P_A$, $P_{2-5}$, $P_{3-1}$, $P_{3-5}$, $P_{4-1}$, $P_{4-5}$, $P_{5-1}$, $P_{5-2}$, $P_{5-3}$, $P_{5-4}$, and $P_{5-5}$), or a position between $P_A$ and $P_{2-5}$ (i.e., $P_{1-1}$, $P_{1-2}$, $P_{1-3}$, $P_{1-4}$, $P_{1-5}$, $P_{2-1}$, $P_A$, $Q_A$, $P_{2-5}$, $P_{3-1}$, $P_{3-5}$, $P_{4-1}$, $P_{4-5}$, $P_{5-1}$, $P_{5-2}$, $P_{5-3}$, $P_{5-4}$, $P_{5-5}$), so that when the second image data is read, the region expression information $Q_A$ and the region pixel value $P_A$ are correlated with each other. Alternatively, the region expression information $Q_A$ may be located at the very front of the sequence of pixel values (i.e., before $P_{1-1}$) or may be located at the very end of the sequence of pixel values (i.e., behind $P_{5-5}$). Further, a mark may be inserted near the position of the region pixel value $P_A$, and the mark is used to indicate the region expression information $Q_A$, so that the region expression information $Q_A$ and the region pixel value $P_A$ may be correlated with each other when the second image data is read.

It will be noted that, in the case where the pixel values of the pixels in the first image data of the first image are arranged in an array, the region pixel value and the pixel values of the second pixels in the second image data may not be arranged in an array.

In addition, in a case where all the pixels in the first image may be classified into the first compression-allowed region, for example, the displayed picture of the first image is a pure color picture (e.g., a completely black picture or a completely white picture), in this case, there is no pixel outside the first compression-allowed region in the first image, that is, there is no second pixel, and correspondingly, there is no pixel value of the second pixel in the first image. Therefore, the second image data only includes the region expression information of the first compression-allowed region and the region pixel value of the first compression-allowed region.

For example, in the case where the pixels in the first image are arranged in an array, and a difference between any two of the pixel values of the pixels of H rows and J columns in the first image is within a preset range (for example, all the pixels display black), a region where the pixels of H rows and J columns are located is a first compression-allowed region. If all the pixels in the first compression-allowed region are encoded, a data storage size Z of the first compression-allowed region is obtained by $Z = H \times J \times W / 8$, where Z represents a byte size of an image corresponding to the first compression-allowed region, H and the J are both positive integers (for example, H is equal to 10 (H=10), and J is equal to 20 (J=20)), and ($H \times J$) represents the number of the pixels in the first compression-allowed region; H may be regarded as a height of the first compression-allowed region (i.e., a length of the first compression-allowed region in the column direction), and J may be regarded as a width of the first compression-allowed region (i.e., a length of the first compression-allowed region in the row direction); W represents a pixel depth (i.e., the number of bits of store pixels); for example, W may be 8, 16 or 32. While encoding the region expression information and the region pixel value of the first compression-allowed region, the size of the region pixel value is a pixel depth, and the obtained data storage size of the first compression-allowed region is relatively small, for example, for the first compression-allowed region constituted by the pixels of H rows and J columns, the shape in the region expression information occupies 1 byte, and the coordinates of two pixels occupy 2 bytes, and the region pixel value RGB occupies 6 bytes totally, thus the storage size of the second image data is reduced.

To sum up, in the image processing method provided by the embodiments of the present disclosure, the region expression information of the first compression-allowed region is obtained in the case where the first image has a first compression-allowed region, the region pixel value of the first compression-allowed region is determined according to the pixel value of at least one first pixel in the first compression-allowed region, and the second image data including the region expression information of the first compression-allowed region and the region pixel value of the first compression-allowed regions is generated. In this case, the electronic device encodes the first image data, the pixel values of the pixels in the first compression-allowed region are represented with the region expression information and the region pixel value of the first compression-allowed region. Since the data amount of the region expression information and the region pixel value is less than the data amount of the pixel values of the plurality of pixels in the first compression-allowed region, compared with the amount of a second image data obtained by encoding all the pixel values of the plurality of pixels in the first compression-allowed region, the data amount of the second image data generated by the image processing method provided by the embodiments of the present disclosure is relatively small. Therefore, in the process of image data transmission, the bit rate of transmitting the second image data may be reduced to avoid the problem of image loss caused by errors in the process of transmitting image data. Moreover, the requirements of image transmission are reduced, so that the data transmission may be performed in a case where the quality of transmission-network is relatively poor. In addition, the storage resource required by the electronic device to store the second image data and the encoding resource required to obtain the second image data in the process of encoding the first image data may be reduced, so that the cost of performing image processing by the electronic device is saved.

In some embodiments, the first compression-allowed region has at least one closed border, and the figure formed by each border is in a second preset shape.

It will be noted that, a figure formed by a border is in a second preset shape, and the type of the second preset shape is not limited. For example, the second preset shape may be a relatively simple shape including a sector, a circle, an ellipse, a triangle, a quadrilateral or a polygon, or may be a relatively complex shape including a wavy line, a sine curve, or a parabola curve. For example, in the first image T in FIG. 10, the first compression-allowed region A has two closed borders $L_{A1}$ and $L_{A2}$, the figure formed by the closed border $L_{A1}$ is in a shape of an ellipse, and the figure formed by another closed border $L_{A2}$ is in a shape of a circle.

In a case where the first compression-allowed region has a plurality of closed borders, the second preset shapes of the figures formed by the borders may be the same or different. For example, the first compression-allowed region has two closed borders, namely a first border and a second border located outside the first border, and the second preset shapes of the figure formed by the first border and the figure formed by the second border are both circles, that is, the first compression-allowed region is in a shape of a circular ring; alternatively, the second preset shape of the figure formed by the first border is a quadrangle, and the second preset shape of the figure formed by the second border is a circle.

As shown in FIG. 11, before generating the second image data of the first image, the image processing method further includes S105.

In S105, in a case where a second compression-allowed region exists in the first image, a sub-region formed by at least one border with the second preset shape in the second compression-allowed region is determined to be the first compression-allowed region. The second compression-allowed region includes a region where the plurality of first pixels that are continuously distributed in the first image are located.

For example, the at least one border with the second preset shape of the second compression-allowed region is the same as at least one border of the first compression-allowed region, the second compression-allowed region is the same as the first compression-allowed region.

The region expression information of the first compression-allowed region includes the second preset shape and position information corresponding to each border of the first compression-allowed region, and the position information is configured to represent a position of each border based on the second preset shape of each border.

For example, the at least one closed border includes an outer border of the second compression-allowed region. Determining the sub-region formed by the at least one border with the second preset shape in the second compression-allowed region to be the first compression-allowed region, as shown in FIG. 11, includes S1051.

In S1051, inscribed figures each with the second preset shape is determined inside the outer border of the second compression-allowed region, and a border of an inscribed figure having the largest area in the inscribed figures each with the second preset shape is determined to be an outer border of the first compression-allowed region.

It will be understood that, the region expression information of the first compression-allowed region includes the second preset shape and position information of the outer border of the first compression-allowed region (i.e., the second preset shape and position information of the inscribed figure having the largest area in the inscribed figures in the second compression-allowed region).

For example, referring to FIG. 12, in the first image T, inside an outer edge $L_{C1}$ of a second compression-allowed region C, there are inscribed figures each with the second preset shape, which are an inscribed figure K1 with the second preset shape of a quadrangle and an inscribed figure K2 with the second preset shape of a circle, and an area of the circle is larger than an area of the quadrangle. Therefore, a border of the inscribed figure K2 with the second preset shape of a circle is determined to be an outer border $L_{A1}$ of the first compression-allowed region A. In this case, the region expression information of the first compression-allowed region A includes the second preset shape and position information of the outer border $L_{A1}$. The second preset shape is a circle, and the position information is the position information of the inscribed figure K2 (for example, the position information is coordinates of a center of the circle and a radius of the circle, or may be the coordinates of the center of the circle and coordinates of any position on the circular arc). Moreover, in a case where the second compression-allowed region includes only one border, the region enclosed by the border of the inscribed figure K2 with the second preset shape of a circle is the first compression-allowed region A. In this case, the region expression information of the first compression-allowed region A is the second preset shape and position information of the outer border $L_{A1}$.

For example, the at least one closed border further includes inner border of the second compression-allowed region. Determining the sub-region formed by at least one border with the second preset shape in the second compression-allowed region to be the first compression-allowed region includes S1052.

In S1052, circumscribed figures each with the second preset shape is determined outside the inner border of the second compression-allowed region, and a border of a circumscribed figure having the smallest area in the circumscribed figures each with the second preset shape is determined to be an inner border of the first compression-allowed region.

It will be understood that, the region expression information of the first compression-allowed region further includes the second preset shape and position information of the inner border of the first compression-allowed region (i.e., the second preset shape and position information of the circumscribed figure having the smallest area in the at least one circumscribed figure in the second compression-allowed region).

Figure 13:
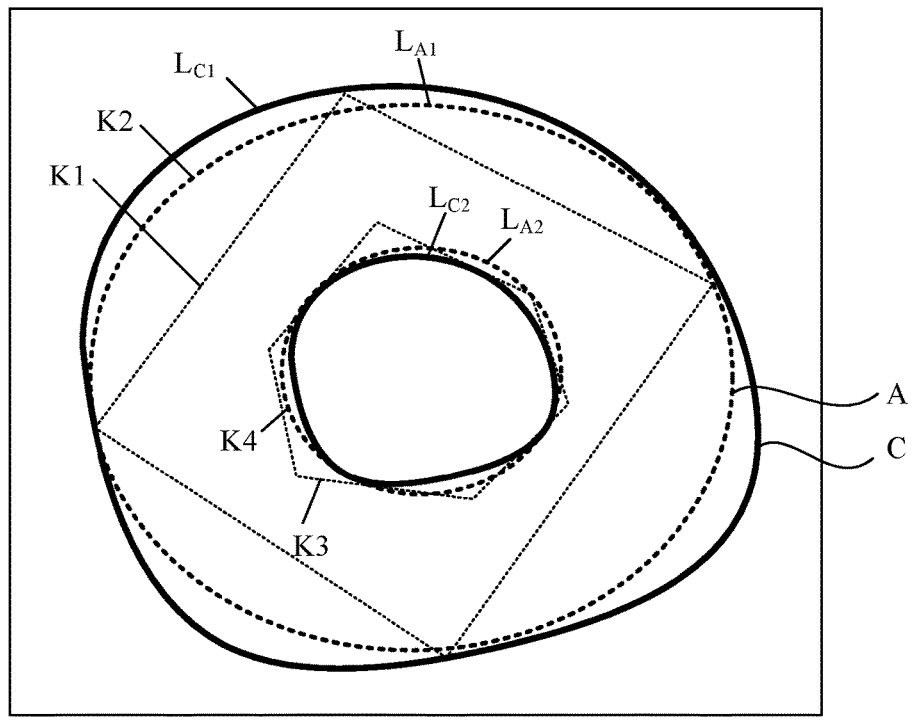
FIG. 13 is a schematic diagram showing regions of yet another first image, in accordance with some embodiments.

For example, referring to FIG. 13, in the first image T, outside the inner border $L_{C2}$ of the second compression-allowed region C, there are circumscribed figures each with the second preset shape, which are a circumscribed figure K3 with the second preset shape of a hexagon and a circumscribed figure K4 with the second preset shape of a circle, and an area of the circle is smaller than an area of the hexagon. Therefore, the border of the circumscribed figure K4 with the second preset shape of a circle determined to be the inner border $L_{A2}$ of the first compression-allowed region A. In this case, the region expression information of the first compression-allowed region A includes the second preset shape and position information of the inner border $L_{A2}$. The second preset shape is a circle, and the position information is a position information of the circumscribed figure K4 (for example, the position information may be coordinates of a center of the circle and a radius of the circle, or may be the coordinates of the center of the circle and coordinates of any position on the circular arc). Moreover, in a case where the first compression-allowed region A includes the outer border $L_{A1}$ and the inner border $L_{A2}$, the first compression-allowed region A may be a region between the outer border $L_{A1}$ and the inner border $L_{A2}$, and the region expression information of the first compression-allowed region A includes both the second preset shape and the position information of the outer border $L_{A1}$ and the second preset shape and the position information of the inner border $L_{A2}$.

For example, the position information in the region expression information of the first compression-allowed region includes coordinates of at least two pixels in the first compression-allowed region.

For example, the region expression information of the first compression-allowed region may be obtained as follows. According to the coordinates of a plurality of pixels on the outer border of the second compression-allowed region, a figure equation database may be called to obtain equations of a plurality of inscribed figures. Among the equations of the plurality of inscribed figures, an equation corresponding to an inscribed figure with the largest area in the plurality of inscribed figures is a figure equation of the outer border of the first compression-allowed region. The shape of the first compression-allowed region included in the region expression information of the first compression-allowed region is a shape corresponding to the figure equation, and the position information in the region expression information of the first compression-allowed region includes the coordinates of at least two pixels in the first compression-allowed region, and the coordinates of the at least two pixels satisfy the figure equation. Similarly, according to coordinates of a plurality of pixels on the inner border of the second compression-allowed region, the figure equation database is called to obtain equations of a plurality of circumscribed figures. Among the equations of the plurality of circumscribed figures, an equation corresponding to the circumscribed figure with the smallest area is a figure equation of the inner border of the first compression-allowed region. The shape of the first compression-allowed region included in the region expression information of the first compression-allowed region is a shape corresponding to the figure equation, and the position information in the region expression information of the first compression-allowed region includes the coordinates of at least two pixels in the first compression-allowed region, and the coordinates of the at least two pixels satisfy the figure equation.

It will be noted that, the electronic device 100 (e.g., the first electronic device 100A) is pre-configured with the figure equation database. The figure equation database includes mathematical expressions of various figures. The types of figures may be set according to actual situations, which are not limited here. For example, the various figures include a circle, an ellipse, and a sector. For figures without mathematical expressions such as a triangle or a rectangle, a plurality of linear equations are obtained, and a closed region formed by the plurality of linear equations are a triangle, or a rectangle.

For example, for the equation of a circle: $(x-a)^2 + (y-b)^2 = R^2$, the coordinates (x, y) of a plurality of pixels on the outer border of the second compression-allowed region may be substituted into the equation to obtain a plurality of equations of inscribed circles and coordinates (a, b) of centers and radii R corresponding thereto. The equation corresponding to an inscribed circle with the largest area is obtained according to the coordinates (a, b) of a center of a circle and a radius R corresponding to an equation of each circle. A border of the circle expressed by the equation of the inscribed circle may be determined to be the outer border of the first compression-allowed region. Similarly, the coordinates (x, y) of a plurality of pixels on the inner border of the second compression-allowed region may be substituted into the equation to obtain a plurality of equations of circumscribed circles and coordinates (a, b) of centers and radii R corresponding thereto. The equation corresponding to a circumscribed circle with the largest area is obtained according to the coordinates (a, b) of a center and a radius R corresponding to an equation of each circumscribed circle. A border of the circle expressed by the equation of the circumscribed circle may be determined to be the inner border of the first compression-allowed region.

It will be noted that, for a relatively simple image such as a histogram, the shape of the first compression-allowed region in the image is relatively regular, and the above-mentioned image processing method may be used for image processing. For a relatively complex image such as an image in which the shape of the first compression-allowed region is irregular (for example, the shape type cannot be obtained by the figure equation database), Tupper's self-referential formula may be used to obtain the shape of the first compression-allowed region, and the Tupper's self-referential formula is included in the figure equation database; alternatively, in the case where the process of obtaining the shape of the first compression-allowed region is relatively complicated and the amount of computation is relatively large, the pixel values of the pixels in the first compression-allowed region may be encoded (compressed), that is, the second image data includes the pixel values of the pixels in the first compression-allowed region, so that the accuracy of the image in the first compression-allowed region may be ensured and image distortion may be avoided.

For example, in a case where the second preset shape of a border of the first compression-allowed region is the second preset shape of the first compression-allowed region, the region expression information of the first compression-allowed region may be expressed as [Shape (rectangle), X1, Y1, X2, Y2], where Shape (rectangle) indicates that the second preset shape of the first compression-allowed region is a rectangle; X1, Y1, X2 and Y2 indicate the position information of the first compression-allowed region; (X1, Y1) is the coordinates of a pixel on the border of the first compression-allowed region, and (X2, Y2) is the coordinates of another pixel on the border of the first compression-allowed region. These two pixels may be the pixels at two end of a diagonal of the rectangle. In this case, if the region pixel value of the first compression-allowed region is in RGB data format, the region expression information and the region pixel value of the first compression-allowed region may constitute a data group, and the data group is [Shape (rectangle), X1, Y1, X2, Y2, R, G, B].

It will be noted that, in a case where the first image has a plurality of first compression-allowed regions, the shapes and sizes of the plurality of first compression-allowed regions may be the same or different respectively. In a case where the shapes and sizes of the plurality of first compression-allowed regions are different respectively, for example, the position information of the region expression information is large and complex, the number of storage bits of the data group constituted by the region expression information and the region pixel value of each first compression-allowed region may be adjusted according to actual situations. In this case, the lengths of the data groups each constituted by the region expression information and the region pixel value of the first compression-allowed region are not exactly the same.

In addition, in a case where the first compression-allowed region is a non-closed figure (for example, the first compression-allowed region is in a shape of a straight line, a parabola curve, or a sine curve), pixel values of a plurality of pixels in the first compression-allowed region may be substituted into the figure equation database to obtain the shape of the non-closed figure, and the region expression information includes at least coordinates of pixels located at two end points of the non-closed figure (for example, the two extreme end points of a straight line).

In some embodiments, as shown in FIG. 5, the image processing method further includes S106. In S106, the second image data is sent to an electronic device.

Figure 14:
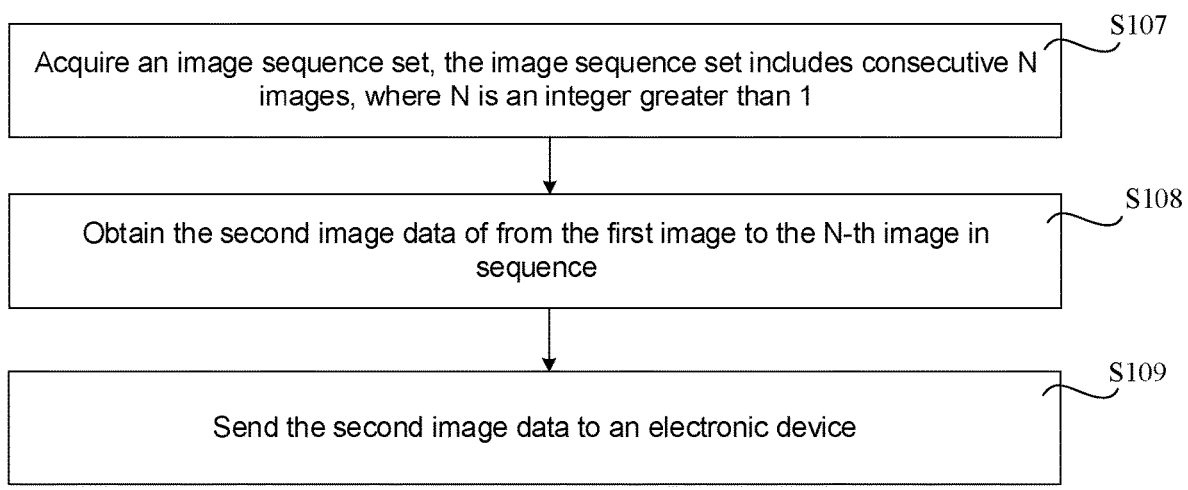
FIG. 14 is a flow diagram of yet another image processing method, in accordance with some embodiments.

Some embodiments of the present disclosure provide an image processing method, as shown in FIG. 14, the image processing method includes S107 to S108.

In S107, an image sequence set is acquired, the image sequence set includes consecutive N images, and N is an integer greater than 1. Data of a first image in the N images is the first image data. The first image data includes pixel values of a plurality of pixels in the first image.

It will be noted that, a video may include at least one image sequence set, and a single image in the image sequence set may also be referred to as a single frame. The image sequence set may be referred to as a group of pictures. In this case, the first image data is acquired, that is, the data of the first image in the N images is acquired, and a second image data of the first image is generated according to the data of the first image in the N images.

In S108, second image data of from the first image to the N-th image is obtained in sequence. The second image data of the first image includes region expression information and region pixel value(s) of first compression-allowed region(s) in the first image.

It will be noted that, for the method of obtaining the second image data of the first image, reference may be made to the above-mentioned method of generating the second image data of the first image, and the first image serves as the above-mentioned first image, which will not be described in detail here again.

In the case where a difference between the pixel value of each pixel in a first compression-allowed region of the first image and a pixel value of a respective pixel in a first compression-allowed region of an M-th image are within a preset range, the second image data of the M-th image includes the region expression information and the region pixel value of the first compression-allowed region of the M-th image, and the pixel values of the second pixels in the M-th image. Moreover, the region expression information and region pixel value of the first compression-allowed region of the M-th image are the region expression information and the region pixel value of the first compression-allowed region of the first image, respectively. M is greater than or equal to 2 and is less than or equal to N(2≤M≤N), and M is an integer.

For example, in a case where the pixels of each of the N images are arranged in an array, and pixels in the first compression-allowed region of the first image are arranged in an array of 3 rows and 3 columns, a pixel value of each of the pixels from the first row and the first column to the third row and the third column in the first compression-allowed region of the first image is compared with a pixel value of a respective pixel of pixels in the M-th image corresponding to the first row and the first column to the third row and the third column in the first compression-allowed region, so as to determine whether the difference of the pixel values are within a preset range (for example, the pixel value of the pixel in the first row and the first column in the first compression-allowed region of the first image is compared with the pixel value of the pixel in the M-th image corresponding to the first row and the first column in the first compression-allowed region, so as to determine whether the difference of pixel values of the two pixels is within the preset range). If so, image data corresponding to the first compression-allowed region in the second image data of the M-th image may be the region expression information and the region pixel value of the first compression-allowed region of the first image. That is, the region expression information and the region pixel value of the first compression-allowed region of the M-th image are respectively the region expression information and the region pixel value of the first compression-allowed region in the first image.

In this case, the region expression information and the region pixel value of the first compression-allowed region of the M-th image (e.g., the information such as the shape, position, gray scale, chromaticity and saturation of the first compression-allowed region of the M-th image) may be directly obtained according to the region expression information and the region pixel value of the first compression-allowed region of the first image. Therefore, there is no need to perform image processing sequentially on first image data of images except for the first image in the N images, so that the time of image processing may be shortened and the efficiency of image processing may be improved.

In some embodiments, each image includes a foreground part and a background part. The background part of the first image has at least one first compression-allowed region.

It will be noted that, the foreground part in the image is the part that moves relatively in the image sequence set, and the background part is the part that is relatively static in the image sequence set. For example, the foreground part may include human, animals and cars, and the background part may include the ground, buildings and the sky. The background part in each image of the image sequence set may be considered approximately the same and their positions are not movable, and the position of the foreground part in each image is movable.

In the case where the foreground part of the M-th image have no overlapped region with the at least one first compression-allowed region, the region expression information and the region pixel values of the first compression-allowed regions of the M-th image included in the second image data of the M-th image are respectively the region expression information and the region pixel value of the first compression-allowed region of the first image.

For example, as shown in FIG. 15, in a case where a foreground part D(M) of the M-th image has no overlapped region with at least one first compression-allowed region A(1) in a background part S(1) of the first image, since a background part S(M) of the M-th image is approximately the same as the background part S(1) of the first image, the foreground part D(M) of the M-th image has no overlapped region with at least one first compression-allowed region A(M) in the background part S(M) of the M-th image. In this case, the first compression-allowed region A(M) of the M-th image is the same as the first compression-allowed region A(1) of the first image. In this way, the region expression information and region pixel value of the first compression-allowed region A(M) of the M-th image may be the region expression information and region pixel value of the first compression-allowed region A(1) of the first image, respectively. Moreover, the pixel values of the second pixels of the M-th image in the second image data are pixel values of pixels in the foreground part D(M) of the M-th image, and pixel values of pixels outside the first compression-allowed region in the background part S(M) of the M-th image.

Figure 16:
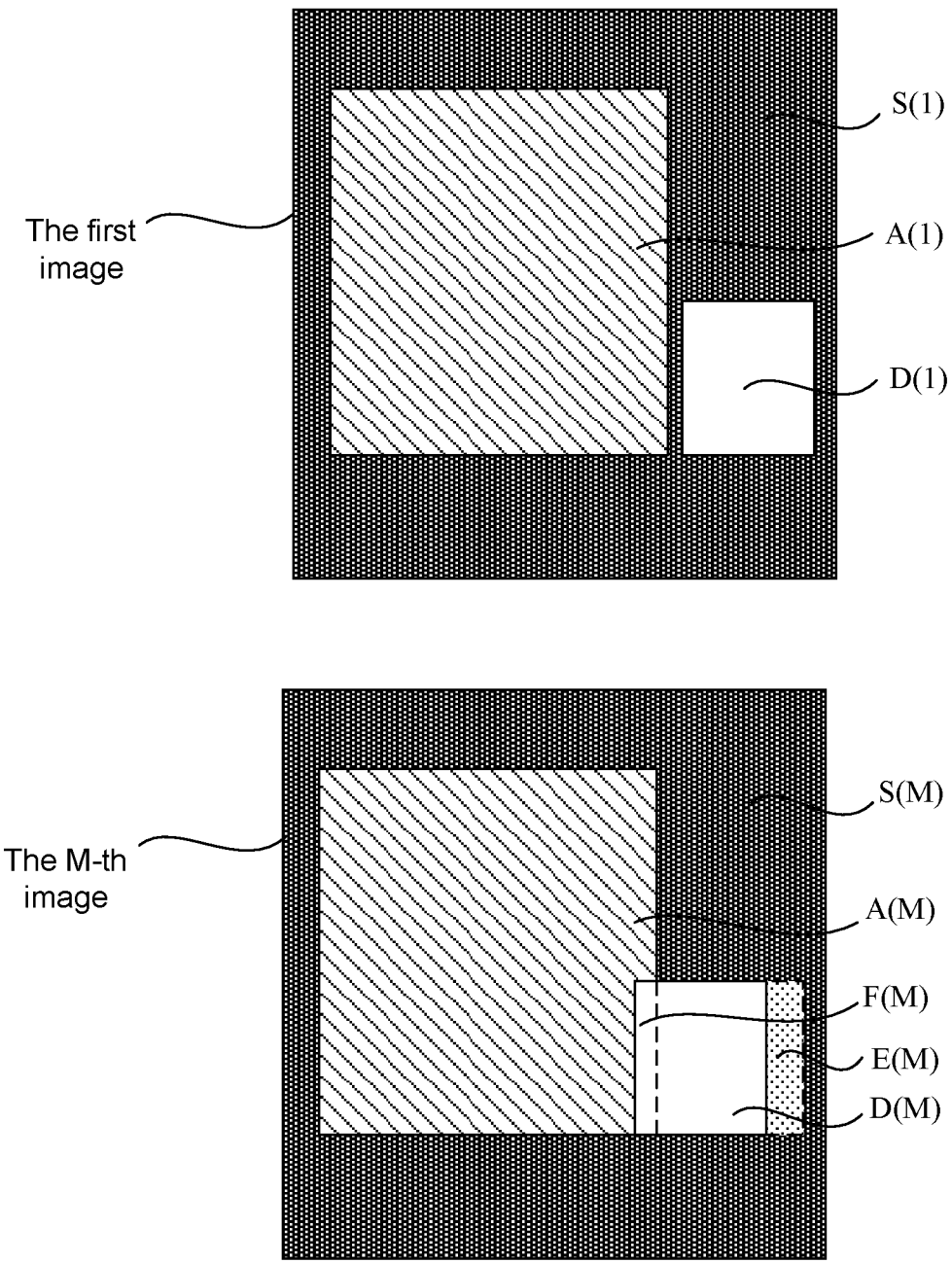
FIG. 16 is a diagram showing a comparison between a first image and another M-th image, in accordance with some embodiments.

In a case where the foreground part D(M) of the M-th image has an overlapped region with at least one first compression-allowed region A(1) in the background part S(1) of the first image (that is, in a case where the foreground part D(M) of the M-th image has an overlapped region with at least one first compression-allowed region A(M) in the background portion S(M) of the M-th image), as shown in FIG. 16, the overlapped region between the foreground part D(M) of the M-th image and the first compression-allowed region A(M) is represented by F(M). After the foreground part D(M) of the M-th image moves relative to the foreground part D(1) of the first image, and the region which has no overlapped region with the foreground part D(M) of the M-th image in the region where the foreground part D(1) of the first image is located is represented by E(M). In this case, the second image data of the M-th image may include the region expression information and region pixel value of the first compression-allowed region A(1) of the first image, the pixel values of the pixels in the foreground part D(M) of the M-th image, pixel values of pixels in the region E(M), and pixel values of pixels in the remaining regions in the M-th image.

In this case, in the process of displaying image according to the second image data of the M-th image, for the overlapped region F(M) overlapping with the foreground part of the M-th image in the first compression-allowed region, pixel values of pixels in the overlapped region F(M) are replaced from the region pixel value of the first compression-allowed region to the pixel values of the pixels of the foreground part of the M-th image, so that the pixels in the overlapped region F(M) may be displayed according to the pixel values of the pixels corresponding to the foreground part of the M-th image, so as to ensure that the image in the foreground part may be displayed correctly. In addition, each pixel in the region E(M) is displayed according to the respective pixel value, and pixels in the first compression-allowed region except the overlapped region is displayed according to the region pixel value.

In some embodiments, as shown in FIG. 14, the image processing method further includes S109.

In S109, the second image data is sent to an electronic device.

For example, the first electronic device 100A sends the second image data to the second electronic device 1008. In a case where the second electronic device 100B is a product with a display (e.g., an all-in-one computer, a notebook computer, or a mobile phone), the second electronic device 1006 displays image according to the second image data.

Some embodiments of the present disclosure provide an image processing method, which may be applied to the electronic device 100 as described above, or may be applied to the second electronic device 1006. For example, the electronic device 100 and the second electronic device 1006 may be a display device, which is a product having a display.

Figure 17:
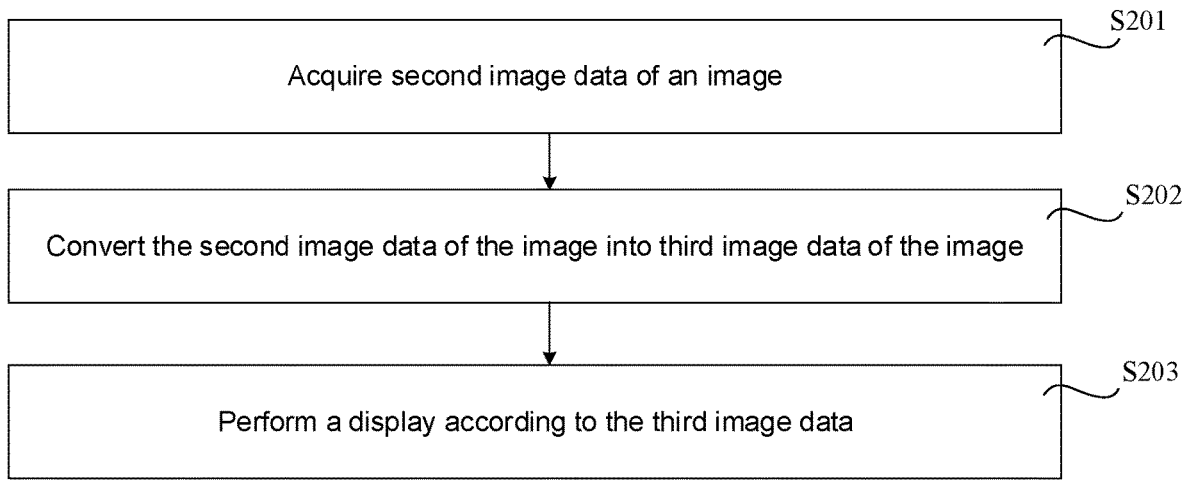
FIG. 17 is a flow diagram of yet another image processing method, in accordance with some embodiments.

As shown in FIG. 17, the image processing method includes the following steps.

In S201, second image data of an image is acquired.

The image has first compression-allowed region(s), and a first compression-allowed region includes a region where a plurality of first pixels continuously distributed are located in the image. Each first pixel is one of the plurality of first pixels, and a difference between pixel values of any two first pixels in the plurality of first pixels is within a preset range. The second image data of the image includes region expression information of the first compression-allowed region and a region pixel value of the first compression-allowed region.

For example, the second image data of the image further includes pixel values of second pixels in the image, and the second pixels are pixels located outside the first compression-allowed region in the image.

In S202, the second image data of the image is converted into third image data of the image. Pixel values of pixels located inside the first compression-allowed region in the third image data are each the region pixel value.

It will be understood that, pixel values of pixels located outside the first compression-allowed region in the third image data are the pixel values of the corresponding second pixels in the second image data. For example, referring to FIG. 9, in a case where the plurality of pixels $P_{1\text{-}1}$, $P_{1\text{-}2}$, ..., $P_{5\text{-}4}$, and $P_{5\text{-}5}$ in the image are arranged in an array of 5 rows and 5 columns, and the first compression-allowed region A in the image is a region where pixels $P_{2\text{-}2}$, $P_{2\text{-}3}$, $P_{2\text{-}4}$, $P_{3\text{-}2}$, $P_{3\text{-}3}$, $P_{3\text{-}4}$, $P_{4\text{-}2}$, $P_{4\text{-}3}$ and $P_{4\text{-}4}$ arranged in an array of 3 rows and 3 columns with the pixel ($P_{3\text{-}3}$) in the third row and the third column as a center are located, region expression information $Q_A$ and a region pixel value $P_A$ of the first compression-allowed region A and the pixel values of the second pixels in the second image data are arranged in sequence row by row (i.e., in the order of $P_{1\text{-}2}$, $P_{1\text{-}3}$, $P_{1\text{-}4}$, $P_{1\text{-}5}$, $P_{2\text{-}1}$, $Q_A$, $P_A$, $P_{2\text{-}5}$, $P_{3\text{-}1}$, $P_{3\text{-}5}$, $P_{4\text{-}1}$, $P_{4\text{-}5}$, $P_{5\text{-}1}$, $P_{5\text{-}2}$, $P_{5\text{-}3}$, $P_{5\text{-}4}$, and $P_{5\text{-}5}$). In this case, the obtained third image data by converting the second image data may be $P_{1\text{-}1}$, $P_{1\text{-}2}$, $P_{1\text{-}3}$, $P_{1\text{-}4}$, $P_{1\text{-}5}$, $P_{2\text{-}1}$, $P_A$, $P_A$, $P_A$, $P_{2\text{-}5}$, $P_{3\text{-}1}$, $P_A$, $P_A$, $P_A$, $P_{3\text{-}5}$, $P_{4\text{-}1}$, $P_A$, $P_A$, $P_A$, $P_{4\text{-}5}$, $P_{5\text{-}1}$, $P_{5\text{-}2}$, $P_{5\text{-}3}$, $P_{5\text{-}4}$, and $P_{5\text{-}5}$.

It will be noted that, the process of obtaining the second image data according to the first image data may be regarded as compressing the first image data, and the process of obtaining the third image data according to the second image data may be regarded as decompressing the second image data.

For example, in a case where the region expression information of the first compression-allowed region in the second image data includes a second preset shape and position information corresponding to each border of the first compression-allowed region, a position and size of the first compression-allowed region may be obtained according to the second preset shape and position information. An equation corresponding to the second preset shape is obtained according to the second preset shape in combination with the figure equation database, and in a case where the position information includes coordinates of at least two pixels in the first compression-allowed region, a position and size of a border (e.g., an outer edge or an inner edge) having the second preset shape in the first compression-allowed region is obtained. For example, a data group constituted by the region expression information and the region pixel value of the first compression-allowed region may be [Shape (rectangle), X1, Y1, X2, Y2, R, G, B]. An equation corresponding to the rectangle is obtained according to the second preset shape in combination with the figure equation database in which the second preset shape of the first compression-allowed region is a rectangle. Moreover, according to the pixel coordinates (X1, Y1) and (X2, Y2) of two ends of a diagonal of the rectangle, a position and size of a border of the rectangle is obtained, that is, the position of each pixel in the first compression-allowed region is obtained. For example, in a case where the plurality of pixels are arranged in an array and the pixel coordinates (X1, Y1) and (X2, Y2) of the two ends of the diagonal of the rectangle are respectively (2, 2) and (4, 4) (that is, pixels at the two ends of the diagonal of the rectangle are the pixel in the second row and the second column, and the pixel in the fourth row and the fourth column, respectively), the pixels in the first compression-allowed region are the pixels from the second column to the fourth column in the pixels from the second row to the fourth row. In this case, the pixel values of the pixels in the first compression-allowed region are all in the RGB data format, where R represents the grayscale voltage of the red sub-pixel, G represents the grayscale voltage of the green sub-pixel, and B represents the grayscale voltage of the blue sub-pixel.

It will be noted that, the electronic device 100 (e.g. the second electronic device 100B) is pre-configured with the figure equation database. The figure equation database includes mathematical expressions of various figures. The types of figures may be set according to actual situations, which are not limited here. For example, the various figures include a circle, an ellipse, and a sector. The figure equation database of the first electronic device 100A and the second electronic device 100B are the same.

In some embodiments, as shown in FIG. 17, the image processing method further includes S203.

In S203, a display is performed according to the third image data.

It will be understood that, the pixels in the first compression-allowed region are all displayed according to the region pixel value. For example, gray scales corresponding to the red sub-pixel, the green sub-pixel and the blue sub-pixel of each pixel in the first compression-allowed region are obtained and displayed according to the grayscale voltage R of the red sub-pixel, the grayscale voltage G of the green sub-pixel and the grayscale voltage B of the blue sub-pixel of each pixel in the first compression-allowed region. Each pixel outside the first compression-allowed region is displayed according to the respective pixel value, that is, each pixel is displayed according to the gray scale corresponding to the pixel value of each pixel.

Since the difference between the pixel values of any two first pixels in the plurality of first pixels in the first compression-allowed region is within the preset range, the difference between the region pixel value and the pixel value of each pixel in the first image data is relatively small, so that the distortion degree of the displayed image is relatively weak in the case where the pixel values of the pixels in the first compression-allowed region is the region pixel value during the display process.

Figure 18:
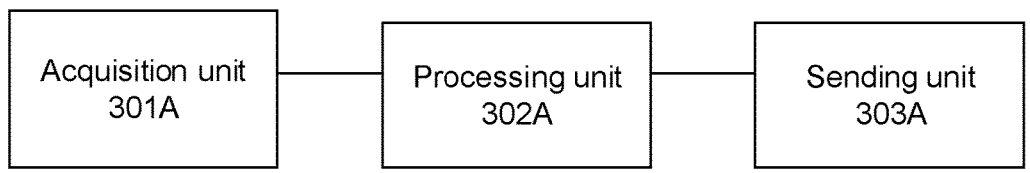
FIG. 18 is a structural diagram of an image processing apparatus, in accordance with some embodiments.

Some embodiments of the present disclosure provide an image processing apparatus 300A, as shown in FIG. 18, the image processing apparatus 300A includes an acquisition unit 301A and a processing unit 302A. The processing unit 302A is coupled to the acquisition unit 301.

The acquisition unit 301A is configured to acquire first image data of a first image, and the first image data includes pixel values of a plurality of pixels in the first image.

The processing unit 302A is configured to obtain region expression information of a first compression-allowed region and determine a region pixel value of the first compression-allowed region according to a pixel value of at least one first pixel in the first compression-allowed region in a case where first compression-allowed region(s) exit in the first image, and to generate second image data of the first image.

The first compression-allowed region includes a region where a plurality of first pixels continuously distributed are located in the first image, and a difference between pixel values of any two first pixels in the plurality of first pixels is within a preset range. The second image data of the first image includes the region expression information of the first compression-allowed region and the region pixel value of the first compression-allowed region. For example, the second image data of the first image further includes pixel values of second pixels in the first image, and the second pixels are pixels located outside the first compression-allowed region in the first image.

In some embodiments, the acquisition unit 301A is further configured to acquire an image sequence set. The image sequence set includes consecutive N images, and N is an integer greater than 1. Data of the first image in the N images is the first image data. The first image data includes the pixel values of the plurality of pixels in the first image.

The processing unit 302A is further configured to acquire second image data of from the first image to the N-th image in sequence. The second image data of the first image includes the region expression information and the region pixel value of the first compression-allowed region of the first image. In a case where a difference between the pixel value of each pixel in the first compression-allowed region of the first image and a pixel value of a pixel value of a respective pixel in the first compression-allowed region of the M-th image is within a preset range, the second image data of the M-th image includes region expression information and a region pixel value of the first compression-allowed region of the M-th image, and pixel values of second pixels in the M-th image, and the region expression information and the region pixel value of the first compression-allowed region of the M-th image are the region expression information and the region pixel value of the first compression-allowed region of the first image, respectively. M is greater than or equal to 2 and is less than or equal to N($2 \leq M \leq N$), and M is an integer.

In some embodiments, as shown in FIG. 18, the image processing apparatus 300A further includes a sending unit 303A. The sending unit 303A is coupled to the processing unit 302A. The sending unit 303A is configured to send the second image data to an electronic device 100 (e.g., the second electronic device 100B as described above).

It will be noted that, the image processing apparatus as described above has the same beneficial effects as the image processing method provided by some embodiments of the present disclosure, which will not be repeated here.

Figure 19:
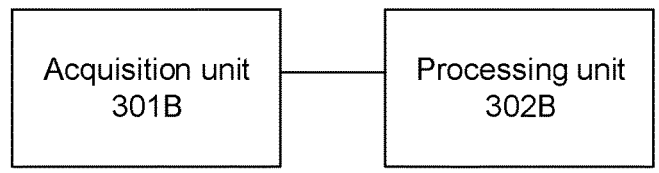
FIG. 19 is a structural diagram of another image processing apparatus, in accordance with some embodiments.

Some embodiments of the present disclosure provide an image processing apparatus 300B, as shown in FIG. 19, the image processing apparatus 300B includes an acquisition unit 301B and a processing unit 302B. The processing unit 302B is coupled to the acquisition unit 301B.

The acquisition unit 301B is configured to acquire second image data of an image. First compression-allowed region(s) exist in the image, and a first compression-allowed region includes a region where a plurality of first pixels continuously distributed are located in the image. A difference between pixel values of any two first pixels in the plurality of first pixels is within a preset range. The second image data of the image includes region expression information of the first compression-allowed region and a region pixel value of the first compression-allowed region. For example, the second image data of the image further includes pixel values of second pixels in the image, and the second pixels are pixels located outside the first compression-allowed region in the image.

The processing unit 302B is configured to convert the second image data of the image into third image data of the image. Pixel values of pixels inside the first compression-allowed region in the third image data are each the region pixel value.

It will be noted that, beneficial effects of the image processing apparatus described above are the same as the beneficial effects of the image processing method as described, which will not be repeated here.

The embodiments of the apparatus described in FIG. 18 and FIG. 19 are merely schematic. For example, division of the above units is merely a kind of logical functional division, and there may be other division manners in practical implementation. For example, a plurality of modules or components may be combined or may be integrated into another system, or some features may be ignored or not executed. The functional units in the embodiments of the present disclosure may be integrated into a single processing module or may be separate physical units; alternatively, two or more units may be integrated into a single module. The units in FIG. 18 and FIG. 19 may be implemented in a form of hardware or in a form of software functional unit. For example, when implemented by software, the acquisition unit 301, processing unit 302, and the like may be implemented by a software functional module generated after at least one processor reads the program code stored in the memory. Alternatively, the units in FIG. 18 and FIG. 19 may be implemented by different hardware in a computer (a display apparatus). For example, the processing unit 302 is implemented by a part of processing resources in at least one processor (e.g., one core or two cores in a multi-core processor), while the acquisition unit 301 is implemented, for example, in a form of hardware, by remaining parts of processing resources in at least one processor (e.g., other cores in the multi-core processor). For example, the above image processing apparatus 300 may be a programmable device, such as a hardware programmable device (e.g., a field programmable gate array (FPGA)). Alternatively, the above functional units may be implemented by means of a combination of software and hardware. For example, the acquisition unit 301, the processing unit 302, and the like are implemented by software functional modules generated after a CPU reads the program codes stored in the memory.

For more details of the acquisition unit 301, the processing unit 302 and the like in FIG. 18 and FIG. 19 implementing the above functions, reference may be made to the descriptions in the foregoing method embodiments, which will not be repeated here.

All the embodiments in the present description are described in an incremental manner. The same or similar parts among all the embodiments are referred to each other. Each embodiment focuses on differences between the embodiment and other embodiments.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instructions are loaded and executed on a computer, the processes or functions according to the embodiments of the present application are generated in whole or in part. The computer may be a general-purpose computer, a dedicated computer, a computer network, or any other programmable apparatus. The computer instructions may be stored in a computer-readable storage medium. The computer-readable storage medium may be any available media that may be accessed by a computer, or a data storage device, such as a server including one or more available media or a data center including one or more available media. The available media may be a magnetic medium (e.g., a floppy disk, a magnetic disk or a magnetic tape), an optical medium (e.g., a digital versatile disk (DVD)), or a semiconductor medium (e.g., a solid state drives (SSD)), etc.

Some embodiments of the present disclosure provide a computer-readable storage medium (e.g., a non-transitory computer-readable storage medium). The computer-readable storage medium has stored therein a computer program instruction that, when run on a computer, cause the computer to perform one or more steps of the image processing method as described in the above embodiments.

For example, the computer-readable storage medium includes but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM)), a card, a stick or a key driver. Various computer-readable storage medium described in the present disclosure may represent one or more devices and/or other machine-readable storage medium, which are used for storing information. The term "machine-readable storage medium" may include, but is not limited to, wireless channels and various other medium capable of storing, containing and/or carrying instructions and/or data.

Some embodiments of the present disclosure further provide a computer program product. The computer program product includes computer program instructions that, when executed on a computer, cause the computer to perform one or more steps of the image processing method as described in the above embodiments.

Some embodiments of the present disclosure further provide a computer program. When the computer program is executed on a computer, the computer program causes the computer to perform one or more steps of the image processing method as described in the above embodiments.

Beneficial effects of the computer-readable storage medium, the computer program product and the computer program are the same as the beneficial effects of the image processing method as described in some of the above embodiments, which will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image processing method, comprising:
    acquiring first image data of a first image; the first image data including pixel values of a plurality of pixels in the first image;
    obtaining region expression information of a first compression-allowed region; the first compression-allowed region existing in the first image, the first compression-allowed region including a region where a plurality of first pixels continuously distributed in the first image are located, and a difference between pixel values of any two first pixels in the plurality of first pixels being within a preset range, wherein the first compression-allowed region has at least one closed border and a figure formed by each closed border is in a second preset shape;
    determining a region pixel value of the first compression-allowed region according to a pixel value of at least one first pixel in the first compression-allowed region; and generating second image data of the first image; the second image data of the first image including the region expression information of the first compression-allowed region and the region pixel value of the first compression-allowed region; and before generating the second image data of the first image, the image processing method further comprising:

determining a sub-region formed by at least one border with the second preset shape in a second compression-allowed region to be the first compression-allowed region; the second compression-allowed region existing in the first image, and the second compression-allowed region including a region where the plurality of the first pixels continuously distributed in the first image are located;

wherein the region expression information of the first compression-allowed region includes the second preset shape and position information corresponding to each closed border of the first compression-allowed region, and the position information is configured to represent a position of the closed border based on the second preset shape of the closed border.

2. The image processing method according to claim 1, wherein obtaining the region expression information of the first compression-allowed region includes:

determining an initial region where at least one object is located in the first image; a figure formed by a border of the at least one object being in a first preset shape; and obtaining the region expression information of the first compression-allowed region in the initial region; the first compression-allowed region existing in the initial region.

3. The image processing method according to claim 2, wherein after determining the initial region where the at least one object in the first image is located, obtaining the region expression information of the first compression-allowed region further includes:

obtaining a reference pixel value; the reference pixel value being a pixel value with largest proportion in number among pixel values of pixels in the initial region; and determining the first compression-allowed region in the initial region; the first compression-allowed region in the initial region including a region where first pixels in the initial region that are continuously distributed in which a difference between a pixel value of each first pixel and the reference pixel value being within the preset range are located.

4. The image processing method according to claim 3, wherein the region pixel value of the first compression-allowed region in the initial region is the reference pixel value of the initial region.

5. The image processing method according to claim 1, wherein determining the sub-region formed by the at least one border with the second preset shape in the second compression-allowed region to be the first compression-allowed region includes:

determining inscribed figures each with the second preset shape inside an outer border of the second compression-allowed region; and determining a border of an inscribed figure having a largest area in the inscribed figures to be an outer border of the first compression-allowed region.

6. The image processing method according to claim 1, wherein determining the sub-region formed by the at least one border with the second preset shape in the second compression-allowed region to be the first compression-allowed region includes:

determining circumscribed figures each with the second preset shape outside an inner border of the second compression-allowed region; and determining a border of a circumscribed figure having a smallest area in the circumscribed figures to be an inner border of the first compression-allowed region.

7. The image processing method according to claim 1, wherein determining the region pixel value of the first compression-allowed region according to the pixel value of the at least one first pixel in the first compression-allowed region includes:

obtaining an average value of the pixel values of the plurality of first pixels in the first compression-allowed region to obtain the region pixel value of the first compression-allowed region.

8. The image processing method according to claim 1, wherein the second image data of the first image further includes pixel values of second pixels in the first image, and the second pixels are pixels located outside the first compression-allowed region in the first image.

9. An electronic device, comprising:

a memory; the memory having stored therein one or more computer program instructions; and a processor; the processor being coupled to the memory; the processor being configured to execute the one or more computer program instructions to cause the electronic device to implement the image processing method according to claim 1.

10. A non-transitory computer-readable storage medium having stored therein computer program instructions, wherein the computer program instructions, when executed by a computer, cause the computer to implement the data processing method according to claim 1.

11. An image processing method, comprising:

acquiring an image sequence set; the image sequence set including consecutive N images, N being an integer greater than 1; data of a first image in the N images being first image data, and the first image data including pixel values of a plurality of pixels in the first image; and obtaining second image data of from the first image to a N-th image in sequence; the second image data of the first image including region expression information and a region pixel value of a first compression-allowed region of the first image, wherein the first compression-allowed region of the first image has at least one closed border, and a figure formed by each closed border is in a second preset shape; and before obtaining the second image data of the first image, the image processing method further comprising:

determining a sub-region formed by at least one border with the second preset shape in a second compression-allowed region to be the first compression-allowed region; the second compression-allowed region existing in the first image, and the second compression-allowed region including a region where the plurality of the first pixels continuously distributed in the first image are located;

wherein the region expression information of the first compression-allowed region of the first image includes the second preset shape and position information corresponding to each closed border of the first compression-allowed region of the first image, and the position information is configured to represent a position of the closed border based on the second preset shape of the closed border;

a difference between a pixel value of each pixel in the first compression-allowed region of the first image and a pixel value of a respective pixel in a first compression-allowed region of an M-th image are within a preset range, the second image data of the M-th image includes region expression information and a region pixel value of the first compression-allowed region of the M-th image and pixel values of second pixels in the M-th image, and the region expression information and the region pixel value of the first compression-allowed region of the M-th image are the region expression information and the region pixel value of the first compression-allowed region of the first image respectively; and M is greater than or equal to 2 and is less than or equal to N, and M is an integer.

12. The image processing method according to claim 11, wherein each image includes a foreground part and a background part; a background part of the first image has the first compression-allowed region; a foreground part of the M-th image has no overlapped region with the first compression-allowed region, the region expression information and the region pixel value of the first compression-allowed region of the M-th image included in the second image data of the M-th image are the region expression information and the region pixel value of the first compression-allowed region of the first image respectively.

13. The image processing method according to claim 11, further comprising:

sending the second image data to an electronic device.

14. A non-transitory computer-readable storage medium having stored therein computer program instructions, wherein the computer program instructions, when executed by a computer, cause the computer to implement the data processing method according to claim 11.

15. An image processing method, comprising:

acquiring second image data of an image; wherein a first compression-allowed region exists in the image, the first compression-allowed region includes a region where a plurality of first pixels continuously distributed are located in the image, and a difference between pixel values of any two first pixels in the plurality of first pixels is within a preset range; the first compression-allowed region has at least one closed border, and a figure formed by each closed border is in a second preset shape; and the second image data of the image includes region expression information of the first compression-allowed region and a region pixel value of the first compression-allowed region; and converting the second image data of the image into third image data of the image; pixel values of pixels inside the first compression-allowed region in the third image data being each the region pixel value; and before generating the second image data of the image, the image processing method further comprising:

determining a sub-region formed by at least one border with the second preset shape in a second compression-allowed region to be the first compression-allowed region; the second compression-allowed region existing in the image, and the second compression-allowed region including a region where the plurality of the first pixels continuously distributed in the image are located;

wherein the region expression information of the first compression-allowed region includes the second preset shape and position information corresponding to each closed border of the first compression-allowed region, and the position information is configured to represent a position of the closed border based on the second preset shape of the closed border.

16. The image processing method according to claim 15, further comprising:

performing a display according to the third image data.

17. A non-transitory computer-readable storage medium having stored therein computer program instructions, wherein the computer program instructions, when executed by a computer, cause the computer to implement the data processing method according to claim 15.

* * * * *